United States Patent
Favor et al.

(10) Patent No.: US 12,118,076 B2
(45) Date of Patent: *Oct. 15, 2024

(54) PHYSICALLY-TAGGED DATA CACHE MEMORY THAT USES TRANSLATION CONTEXT TO REDUCE LIKELIHOOD THAT ENTRIES ALLOCATED DURING EXECUTION UNDER ONE TRANSLATION CONTEXT ARE ACCESSIBLE DURING EXECUTION UNDER ANOTHER TRANSLATION CONTEXT

(71) Applicant: Ventana Micro Systems Inc., Cupertino, CA (US)

(72) Inventors: John G. Favor, San Francisco, CA (US); Srivatsan Srinivasan, Cedar Park, TX (US)

(73) Assignee: Ventana Micro Systems Inc., Cupertino, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 18/130,093

(22) Filed: Apr. 3, 2023

(65) Prior Publication Data

US 2023/0244778 A1      Aug. 3, 2023

Related U.S. Application Data

(63) Continuation of application No. 17/005,307, filed on Aug. 27, 2020, now Pat. No. 11,620,377.

(51) Int. Cl.
*G06F 12/00* (2006.01)
*G06F 9/455* (2018.01)
(Continued)

(52) U.S. Cl.
CPC .......... *G06F 21/52* (2013.01); *G06F 9/45558* (2013.01); *G06F 12/0811* (2013.01);
(Continued)

(58) Field of Classification Search
CPC .. G06F 21/52; G06F 9/45558; G06F 12/0811; G06F 12/0871; G06F 12/0895;
(Continued)

(56) References Cited

U.S. PATENT DOCUMENTS

| | | |
|---|---|---|
| 7,552,254 B1 | 6/2009 | George et al. |
| 2006/0236074 A1 | 10/2006 | Williamson et al. |

(Continued)

OTHER PUBLICATIONS

"Virtual Cache Issues: Advanced Operating Systems COMP9242 2002/S2" Downloaded on Jul. 3, 2020 at http://www.cse.unsw.edu.au/~cs9242/02/lectures/03-cache/node8.html. Pages 1-2.

(Continued)

*Primary Examiner* — Arvind Talukdar
(74) *Attorney, Agent, or Firm* — E. Alan Davis; Huffman Law Group, PC

(57) ABSTRACT

A physically-tagged data cache memory mitigates side channel attacks by using a translation context (TC). With each entry allocation, control logic uses the received TC to perform the allocation, and with each access uses the received TC in a hit determination. The TC includes an address space identifier (ASID), virtual machine identifier (VMID), a privilege mode (PM) or translation regime (TR), or combination thereof. The TC is included in a tag of the allocated entry. Alternatively, or additionally, the TC is included in the set index to select a set of entries of the cache memory. Also, the TC may be hashed with address index bits to generate a small tag also included in the allocated entry used to generate an access early miss indication and way select.

23 Claims, 15 Drawing Sheets

(51) Int. Cl.
*G06F 12/0811* (2016.01)
*G06F 12/0871* (2016.01)
*G06F 12/0895* (2016.01)
*G06F 12/1045* (2016.01)
*G06F 12/14* (2006.01)
*G06F 21/52* (2013.01)
*G06F 21/55* (2013.01)

(52) U.S. Cl.
CPC ...... *G06F 12/0871* (2013.01); *G06F 12/0895* (2013.01); *G06F 12/1054* (2013.01); *G06F 12/1408* (2013.01); *G06F 12/1458* (2013.01); *G06F 21/556* (2013.01); *G06F 2009/45583* (2013.01); *G06F 2009/45587* (2013.01)

(58) Field of Classification Search
CPC ............. G06F 12/1054; G06F 12/1408; G06F 12/1458; G06F 21/556; G06F 2009/45583; G06F 2009/45587
See application file for complete search history.

(56) References Cited

U.S. PATENT DOCUMENTS

| | | | |
|---|---|---|---|
| 2007/0028051 A1* | 2/2007 | Williamson | G06F 12/0864 711/216 |
| 2008/0005504 A1 | 1/2008 | Barnes et al. | |
| 2015/0134931 A1 | 5/2015 | Mukherjee et al. | |
| 2015/0248357 A1 | 9/2015 | Kaplan et al. | |
| 2018/0173645 A1 | 6/2018 | Parker et al. | |
| 2018/0307622 A1* | 10/2018 | Smith | G06F 12/1009 |
| 2019/0163902 A1 | 5/2019 | Reid et al. | |
| 2020/0250099 A1 | 8/2020 | Campbell et al. | |
| 2022/0067142 A1 | 3/2022 | Favor et al. | |
| 2022/0067143 A1 | 3/2022 | Favor et al. | |

OTHER PUBLICATIONS

Hoe, James C. "18-447 Lecture 18: Pages Tables and TLBs" Department of ECE, Carnegie Mellon University. Downloaded Jul. 4, 2020 at https://users.ece.cmu.edu/~jhoe/course/ece447/s16handouts/L18.pdf. pp. 1-25.

Park, Chang Hyun et al. "Efficient Synonym Filtering and Scalable Delayed Translation for Hybrid Virtual Caching." ACM SIGARCH Computer Architecture News. Jun. 2016. https://doi.org/10.1145/300787.3001160 pp. 1-13.

"ARM® Architecture Reference Manual: ARMv7-A and ARMv7-R Edition" ARM DDI 0406C.c ID051414 Copyright@ 1996-1998,2000, 2004-2012, 2014 ARM. pp. B3-1392 thru B3-1394.

"ARM® Architecture Reference Manual: ARMv8, for ARMv8-A architecture provile" ARM DDI 0487F.b ID040120 Copyright@ 2013-2020 ARM Limited or its affiliates. pp. A2-75, D5-2685 -D5-2686, D13-2962, G5-6009 thru G5-6010, and G8-6181.

Abu-Chazaleh, Nael et al. "How the Spectre and Meltdown Hacks Really Worked." IEEE Spectrum. Downloaded on Nov. 24, 2019 from https://spectrum.IEEE.org/computing/hardware/how-the-spectre-andmeltdown-hacks-really-worked. pp. 1-10.

Fruhlinger, Josh. "Spectre and Meltdown Explained: What They Are, How They Work, What's at Risk." CSO Online. Downloaded on Nov. 24, 2019 from https://csoonline.com/article/3247868/spectre-and-meltdown-explained-what-they-are-how-they-work-whats-at-risk.html pp. 1-10.

Frogh, Anders et al. "Wrangling the Ghost: An Inside Story of Mitigating Speculative Execution Side Channel Vulnerabilities." Microsoft. Downloaded on Nov. 24, 2019 from https://i.blackhat.com/US-18/Thu-August-9/US-18-Fogh-Ertl-Wrangling-with-the-Ghost-An-Inside-Story-of-Mitigating-Speculative-Execution-Side-Channels-Vulnerabilities.pdf. pp. 1-44.

Intel Analysis of Speculative Execution Side Channels. White Paper. Revision 1.0. Jan. 2018. Document No. 336983-001. pp. 1-12.

Cache Speculation Side-Channels. Whitepaper. Arm Limited. Version 2.4. Oct. 2018. pp. 1-21.

Kocher, Paul et al. "Spectre Attacks: Exploiting Speculative Execution." Submitted on Jan. 3, 2018. Cornell University, Computer Science, Cryptography and Security. arXiv.org>cs>arXiv:1801.01203. pp. 1-19.

Yarom, Yuval et al. "Flush+Reload: a High Resolution, Low Noise, L3 Cache Side-Channel Attack." The University of Adelaid. Computer Science, IACR Cryptol. ePrint Arch. 2013. pp. 1-14.

Ge, Qian et al. "A Survey of Microarchitectural Timing Attacks and Countermeasures on Contemporary Hardware." Journal of Cryptographic Engineering 8, Apr. 2018. pp. 1-37.

Lipp, Moritz et al. "Meltdown: Reading Kernel Memory from user Space." 27th USENIX Security Symposium. Aug. 15-17, 2018. Baltimore, MD, USA. pp. 973-990 ISBN 978-1-939133-04-5.

* cited by examiner

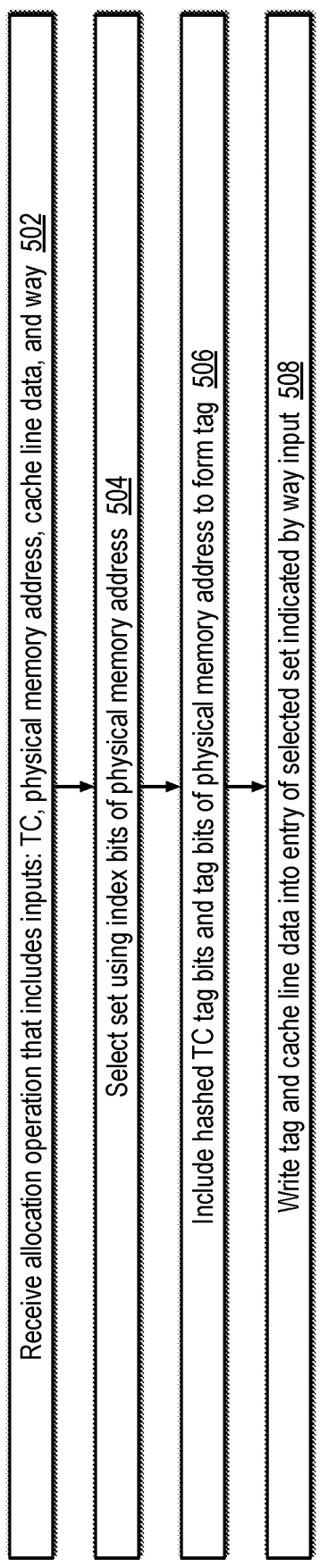

FIG. 5A

Receive allocation operation that includes inputs: TC, physical memory address, cache line data, and way 502

Select set using index bits of physical memory address 504

Include hashed TC tag bits and tag bits of physical memory address to form tag 506

Write tag and cache line data into entry of selected set indicated by way input 508

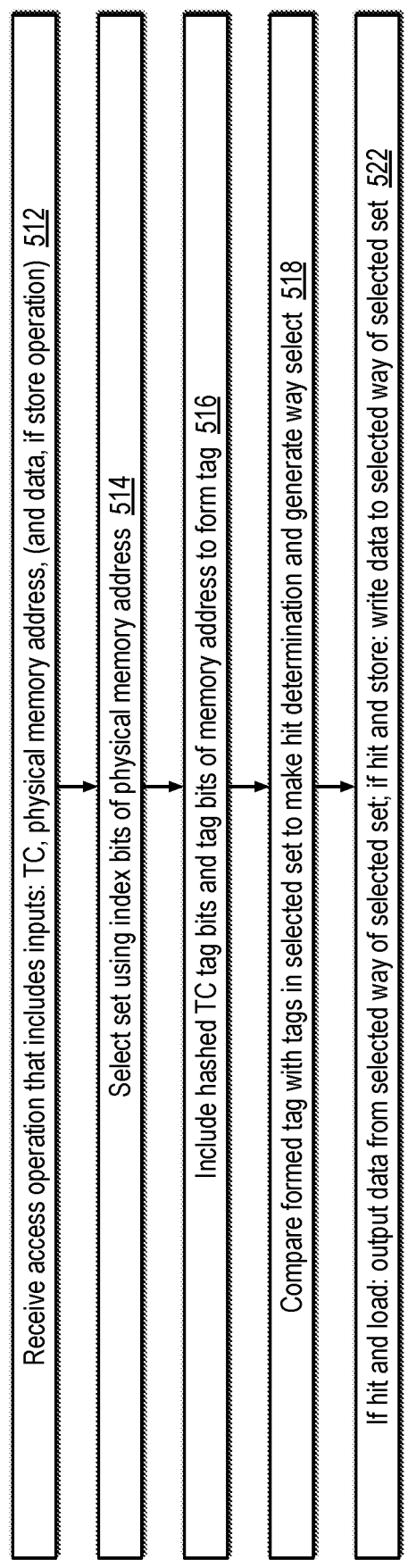

FIG. 5B

Receive access operation that includes inputs: TC, physical memory address, (and data, if store operation) 512

Select set using index bits of physical memory address 514

Include hashed TC tag bits and tag bits of memory address to form tag 516

Compare formed tag with tags in selected set to make hit determination and generate way select 518

If hit and load: output data from selected way of selected set; if hit and store: write data to selected way of selected set 522

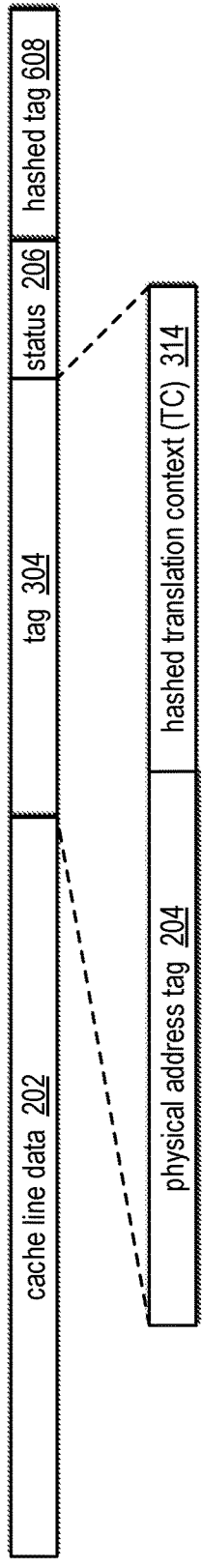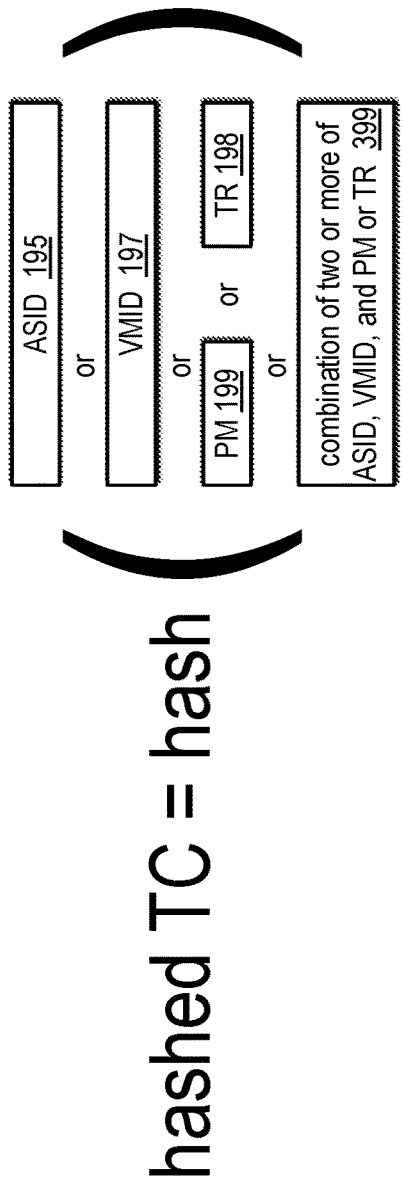
FIG. 6

PHYSICALLY-TAGGED DATA CACHE MEMORY THAT USES TRANSLATION CONTEXT TO REDUCE LIKELIHOOD THAT ENTRIES ALLOCATED DURING EXECUTION UNDER ONE TRANSLATION CONTEXT ARE ACCESSIBLE DURING EXECUTION UNDER ANOTHER TRANSLATION CONTEXT

This application is a continuation of co-pending U.S. patent application Ser. No. 17/005,307 filed on Aug. 27, 2020, now U.S. Pat. No. 11,620,377, which is hereby incorporated by reference in its entirety for all purposes.

BACKGROUND

A side channel is an unintended pathway that leaks information from one software program (a victim program) to another (the attacker program). The leaked information may be a secret that the victim does not want the attacker to know, such as an encryption key or bank account information. The unintended pathway can, in theory, be any shared hardware resource, such as a central processing unit (CPU) cache, a branch predictor, or a translation lookaside buffer (TLB).

Side channel attacks (SCAs) exploit microarchitectural speculation in high-performance CPUs to break architectural security protections. Speculative execution of an instruction means execution of the instruction during a time when at least one instruction older in program order than the instruction has not completed execution such that a possibility exists that execution of the older instruction will result in an abort, i.e., flush, of the instruction. Opportunities for speculative execution by a CPU are often created by predictions, such as predictions of branch instruction outcomes or predictions that the data written to memory by an instruction is the data that a later instruction wants to read. As a result, an attacker may "encode" privileged information into persistent microarchitectural state. For example, an attacker may encode privileged information, such as a security key, in the presence or absence of a line in a cache if speculatively accessed. This presence or absence of the speculatively accessed line in the cache is not the architectural state of the CPU and therefore not directly visible by the attacker program. However, it may be indirectly visible to an SCA.

More specifically, speculative execution may leave traces of the privileged information in microarchitectural state that can then be revealed based upon the time it takes selected instructions to execute. SCA exploits detect these timing "signals" or differences in the timing of accesses to memory addresses to infer the privileged information used by the victim program.

In a "Flush and Reload" attack, for example, the attacker program first flushes cache lines from the cache at 256 possible memory addresses the victim program will access depending upon the value of a secret data byte the attacker wants to determine (e.g., a byte of an encryption key). The attacker program then causes or waits for the victim program to access the secret data byte, use the secret data byte value to generate a memory address (that is one of the 256 known addresses), and bring the data at the (secret data byte-dependent) generated address into the cache. Next, the attacker program systematically accesses the 256 possible address locations, timing how long each of the 256 accesses takes, which is affected by whether a cache hit or cache miss occurs. By determining which of the 256 addresses was quickly accessed (i.e., got a cache hit), the attacker program indirectly determines the value of the secret data byte.

Known side-channel exploits can be roughly categorized into four groups. Spectre-type attacks are based on speculation past control and data dependencies, e.g., branch predictions. Meltdown-type attacks are based on speculation past architectural or microarchitectural faults, e.g., memory protection violations. Microarchitectural data sampling (MDS) type attacks are based on speculative sampling of stale state left in microarchitectural buffers between a processor and its cache. Microarchitectural shared resource type attacks are based on observation of cross-thread contention for shared microarchitectural resources in multi-threaded CPU designs. Furthermore, even in non-multi-threaded CPUs, there may be shared cache resources (e.g., a shared second-level cache or last level cache (LLC) or snoop filters), which may be leveraged in a shared resource type attach. Such attacks have been effective on some CPUs that have a globally shared inclusive LLC.

"Spectre" attacks trick the processor into incorrect speculative execution. Consider a victim program that contains secret data, such as a secret key, in its memory address space. By searching the compiled victim binary and the operating system (OS)'s shared libraries, an attacker discovers instruction sequences, such as conditional and indirect branches, that can be exploited to reveal information from that address space. Assume that the attacker knows the general or specific location of the secret data.

In a conditional branch attack, the attacker writes a program with mis-training and exploitation aspects. First, the attacker program mis-trains the branch predictor of the CPU to predict that a branch condition of a piece of victim code will be satisfied. For example, in the "Spectre v1" attack, an attacker program causes code to run in a victim program that includes a conditional branch instruction, such as "If index1<array1size then index2=array1[index1] and junk=array2 [index2*multiplier]." In the example code, array1 is an array of unsigned bytes and index2 is an unsigned byte. In the victim code, index1 is a large data type (e.g., 32 bits) and can therefore have a very large value. For values of index1 less than array1size, memory accesses are legal; whereas, for values of index1 greater than array1size, memory accesses are illegal. That is, the array bounds check is intended to prevent memory accesses outside array1. The result generated from this first operation ("index2=array1 [index1]") is referred to herein as "index2" because it is used to index into array2. The "multiplier" value causes distinct cache lines to be implicated by different values of the secret byte so that later, during a probing portion of the SCA, the attacker reads from 256 different memory addresses that correspond to 256 different cache lines that are implicated by the 256 different possible values of "index2."

To mis-train the branch predictor, the conditional branch instruction is run with valid values for index1 a sufficient number of times to train the branch predictor to predict that the branch condition will be satisfied, i.e., to train the branch predictor that index1 is within the bounds of array1. Previously, the relevant cache lines are either explicitly or effectively flushed. This constitutes the "flush" and "mis-train" aspects of the attack.

The attacker program then invokes the same conditional branch instruction in the victim code using a malicious index1 value that equals the address offset between the memory location of the first element of array1 and the known or guessed memory location of the secret data byte. (Some SCAs instead invoke a different conditional branch instruction that aliases to the same entry in the branch predictor that was trained by the attacker.) The malicious index1 value is outside the bounds of array1. However, because the branch predictor has been maliciously mis-trained, it predicts that the malicious index1 value is in the bounds of array1 (i.e., index1<array1size). Therefore, the processor speculatively executes "array1[index1]" using the malicious index1 value. This results in the secret data byte value being loaded from the out-of-bounds location in the victim's memory into a register of the processor, namely from the address of the secret data byte.

Because the attacker flushed the value of array1_size from cache prior to invoking the victim code, the processor must bring in array1_size from memory, which means it will take many clock cycles until the processor can detect that the predicted branch instruction associated with the bounds check was mis-predicted. This creates a high likelihood that the second operation using the index2 value equal to the secret data byte to pull junk data into the cache will occur before the branch mis-prediction is detected. That is, the processor likely will speculatively execute the second operation ("junk=array2[index2*multiplier]"). The purpose of the second operation is to place junk data into a unique one of the 256 cache lines selected by the secret data byte value, i.e., index2. The attack does not care about the contents of the cache line; it only cares that the fetch of the cache line sets up the core part of the attack, which identifies the content of the secret data byte.

After the cache line indexed by the secret data byte value is loaded into the otherwise empty cache, the results are observed by the attacker through the cache timing "side channel" to determine the value of the secret data byte. The attacker code performs a third operation "junk=array2 [probe_value*multiplier]" for each of 256 possible 8-bit probe_values, while measuring the amount of time each of the 256 memory accesses takes. This is the core of the attack. Typically, all but one of the 256 runs (and 256 8-bit probe_values) results in a cache miss that requires the processor to access external memory, a slow process that consumes scores of clock cycles. By contrast, a single one of the accesses hits in the cache, which requires a much smaller number of clock cycles. Without directly reading the secret data byte, this side channel portion of the code identifies the probe value associated with the shortest memory access time (the cache hit), knowing that it likely the secret value.

Eventually, the processor discovers that it mis-predicted the bounds check and reverts changes made to its nominal architectural and microarchitectural state, but without reverting the changes made to the cache.

In summary, the Spectre attack works, in the representative example, by (1) knowing where a secret byte is located, (2) flushing the cache, (3) mis-training a branch predictor to mis-predict a malicious array index (based on the known secret byte location) passed to the victim code by the attacker code is within the bounds of a first array, (4) through speculative execution because of the branch prediction, indexing the first array with the malicious value in order to retrieve the secret byte, (5) still through speculative execution, using the secret byte to index a second array spanning at least 256 cache lines in order to load a single cache line indexed by the secret byte value, (6) afterwards, timing accesses to the second array for each of 256 possible index values corresponding to the 256 cache liens, and (7) identifying the index value of the second array access that signifies a cache hit, which will be the secret byte value.

In an indirect branch variant of the Spectre attack, an attacker finds the virtual address of a piece of code in the victim program, known as a gadget, that handles secret data. The attacker program trains the processor's branch target buffer (BTB) to mis-predict the target address of an indirect branch instruction to jump to the gadget. Until the mis-prediction is detected by the processor, it speculatively executes instructions of the gadget, which may cause the secret data to be pulled into the cache making the cache a side channel to determine the secret data value by timing subsequent cache accesses similar to the manner described above with respect to the first Spectre attack.

Together, the "flush" and "side-channel" portions of the code are sometimes referred to as a "flush-and-reload" attack, variants of which are used in many other attacks, for example, Meltdown.

In a "Meltdown" attack, unlike the "Spectre" attack, the attack is not dependent on the use of a conditional branch instruction or the mis-training of a branch predictor in order to speculatively execute a load of secret data. Rather, "Meltdown" directly runs load instruction that reads a secret byte from a selected memory location that the load instruction is not privileged to read. The processor may speculatively execute the load instruction and forward the secret byte to dependent instructions before it discovers and deals with the privilege violation. Some processors have been optimized for performance, e.g., for short cycle times, to delay discovering and/or dealing with the privilege violation since privilege violations tend to occur infrequently (outside of SCAs). This may enlarge the window of speculation for dependent instructions to execute. Specifically, during the enlarged speculation window, the dependent instructions may encode the secret byte value into the cache to create the opportunity for a cache timing attack.

There is also a subset of "Meltdown" attacks known as "Foreshadow" attacks. These attacks exploit speculative TLB operations during address translation and cause terminal faults by clearing (or waiting for the OS to clear) a page table entry (PTE) present bit. The resulting dereferencing of the unmapped page from user memory triggers a terminal fault. This exposes metadata left by the OS in the PTE—for example, the physical address to which the page pointed—to exploitation and discovery by transient instructions.

Some "Foreshadow" variants target virtual machines (allowing transient reads of a virtual machine's exclusive memory space), hypervisors (allowing transient reads of the hypervisor's exclusive memory space), and system management mode memory in addition to OS kernel memory.

There is also a class of MDS attacks that eavesdrop on in-flight data from CPU-internal buffers such as line fill buffers, load ports, and store buffers. The discussion herein focuses on three such variants—a store-buffer variant known as "Fallout," a fill buffer variant known as "MDL" for "Rogue In-Flight Data Load" (alternatively known as "MFBDS" for "Microarchitectural Fill Buffer Data Sampling"), and a load port variant known as "MLPDS" for "Microarchitectural Load Port Data Sampling."

The "Fallout" variant exploits splitting of a store instruction into separate store address (STA) and store data (STD) micro-operations, each of which independently executes and writes into a store buffer. Before the result of an operation is committed to cache memory, it is temporarily stored in a store buffer—a table of address, value, and "is valid" entries. Speculative store-to-load forwarding logic enables the store buffer to forward store data to be used as operands in younger operations. Fallout exploits this to monitor recent stores performed by other programs, containers, operating systems, and virtual machines running on the same hardware thread.

The RIDL or MFBDS variant exploits the design of fill buffers in some processors that support hyper-threading. Transfers of data from a lower level cache or main memory must pass through the fill buffer, each entry of which is the length of a cache line, before it is transferred to the level-1 data cache. When a line in the fill buffer has been transferred, the line is considered as invalid, but the fill buffer continues to retain the stale information transferred by a previous operation. Because logic enables fill buffer data to be speculatively forwarded to subsequent instructions, an attacker program running as a sibling hyper-thread can indirectly determine the value of that information through a side-channel cache timing attack.

The MLPDS variant also exploits hyper-threading. Data loading from a cache line into the register file must go through a load port, which is large enough—e.g., 512 bits wide—to handle the largest possible load the ISA permits. Because there are typically only a couple of load ports servicing a register file, sibling threads of a hyperthreaded core compete for them. In some processors, smaller 8, 16, 32 and 64-bit loads into the load port do not purge any higher-order bits left over from a previous load. While these processors track the size of the load and forward only those corresponding bits to the register file, the entirety of the load port contents, including several higher-order bits of stale data, may be speculatively forwarded to a subsequent malicious operation even as the load port data is in-flight to the register file. Because a single pass of this attack may recover only some of the bits, the attack may be run repeatedly to probabilistically discover a more complete set of data.

SUMMARY

In one embodiment, the present disclosure provides a data cache memory for mitigating side channel attacks in a processor that comprises the data cache memory and that includes a translation context (TC). The data cache memory includes a first input that receives a physical memory address, a second input that receives the TC, and control logic. The control logic is configured to, with each allocation of an entry of the data cache memory, use the received physical memory address and the received TC to perform the allocation of the entry. The control logic is also configured to, with each access of the data cache memory, use the received physical memory address and the received TC in a correct determination of whether the access hits in the data cache memory. The TC comprises an address space identifier (ASID); or a virtual machine identifier (VIVID); or a privilege mode (PM) or a translation regime (TR); or a combination of two or more of the ASID, the VMID, and the PM or the TR.

In another embodiment, the present disclosure provides a method for mitigating side channel attacks in a processor that comprises a data cache memory and that includes a translation context (TC). The method includes, with each allocation of an entry of the data cache memory, using a received physical memory address and a received TC to perform the allocation of the entry. The method also includes, with each access of the data cache memory, using the received physical memory address and the received TC in a correct determination of whether the access hits in the data cache memory. The TC comprises an address space identifier (ASID); or a virtual machine identifier (VMID); or a privilege mode (PM) or a translation regime (TR); or a combination of two or more of the ASID, the VMID, and the PM or the TR.

In yet another embodiment, the present disclosure provides a non-transitory computer-readable medium having instructions stored thereon that are capable of causing or configuring a processor that comprises a data cache memory and that includes a translation context (TC) to perform operations for mitigating side channel attacks. The operations include, with each allocation of an entry of the data cache memory, using a received physical memory address and a received TC to perform the allocation of the entry. The operations also include, with each access of the data cache memory, using the received physical memory address and the received TC in a correct determination of whether the access hits in the data cache memory. The TC comprises an address space identifier (ASID); or a virtual machine identifier (VMID); or a privilege mode (PM) or a translation regime (TR); or a combination of two or more of the ASID, the VMID, and the PM or the TR.

BRIEF DESCRIPTION OF THE DRAWINGS

FIG. 5A is an example flowchart illustrating an operation to allocate an entry into the data cache memory of FIG. 4 in accordance with embodiments of the present disclosure.

FIG. 5B is an example flowchart illustrating an operation to access the data cache memory of FIG. 4 in accordance with embodiments of the present disclosure.

FIG. 6 is an example block diagram of a cache entry that includes translation context information in its tag and that also includes a small hashed tag that includes translation context information in accordance with embodiments of the present disclosure.

DETAILED DESCRIPTION

As may be observed from the foregoing, SCAs prey on processors that engage in speculative execution of instructions. Stated alternatively, speculative execution is a critical component to SCA vulnerability. As may also be observed from the foregoing, SCAs exploit the micro-architectural state of data caches of processors that engage in speculative execution of instructions as side channels. However, speculative execution and data caches significantly improve processor performance. Therefore, high performance processors must continue to include data caches and to engage in speculative execution. Embodiments of processors, data caches and methods are described herein that mitigate SCAs by allowing speculative execution and data caches, but that use additional information, i.e., in addition to the address specified by a data cache allocation/access, to allocate into and access the data cache to reduce the likelihood that an attacker program can successfully probe the data cache to determine secret information based on microarchitectural state left in the data cache as a result of speculative execution. More specifically, the additional information identifies a translation context (e.g., victim) under which an entry was created (allocated) in the data cache so that another translation context (e.g., attacker) cannot subsequently use (access) the cache line in the entry. That is, attempts by the attacker translation context to access the cache line brought into the data cache by the victim translation context will result in a miss. Stated alternatively, a data cache entry is only hit upon by loads/stores executing in the same translation context that brought the cache line into the data cache. Consequently, during the SCA probing phase when the attacker translation context is timing the 256 possible cache line indexes, for example, to determine the secret byte value as described above, the likelihood that the attacker will detect a time difference due to a cache hit on the special cache line that indirectly reveals the secret byte value is greatly minimized since the special cache line access will result in a miss. In one embodiment, the translation context information is included in the tag of each data cache entry when the entry is allocated, and the translation context is used in the tag compared on subsequent data cache accesses in the hit determination. In another embodiment, the translation context information is included in the index bits of the memory address to generate the set index. The translation context is a function of the address space identifier, virtual machine identifier, and/or privilege mode or translation regime under which cache memory entries are allocated and accessed.

Figure 1:
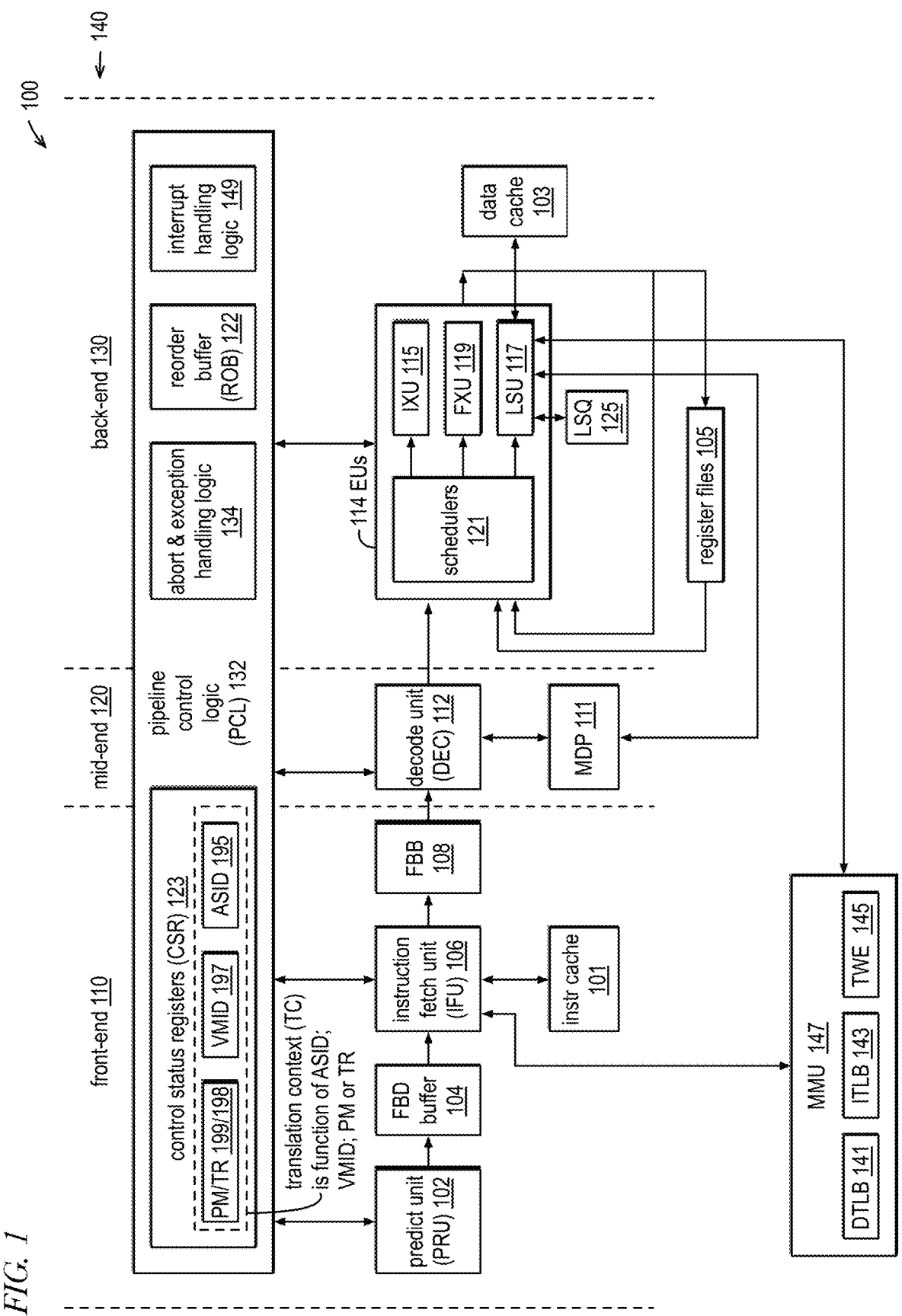
FIG. 1 is an example block diagram of a pipelined super-scalar, out-of-order execution microprocessor core that performs speculative execution in accordance with an embodiment of the present disclosure.

FIG. 1 is an example block diagram of a pipelined super-scalar, out-of-order execution microprocessor core 100 that performs speculative execution in accordance with an embodiment of the present disclosure. Speculative execution of an instruction means execution of the instruction during a time when at least one instruction older in program order than the instruction has not completed execution such that a possibility exists that execution of the older instruction will result in an abort, i.e., flush, of the instruction. The core 100 is configured to mitigate SCAs, as described herein. Although a single core 100 is shown, the SCA mitigation techniques described herein are not limited to a particular number of cores. Generally, the SCA mitigation embodiments may be employed in a processor conforming to various instruction set architectures (ISA), including but not limited to, x86, ARM, PowerPC, SPARC, MIPS. Nevertheless, some aspects of embodiments are described with respect to the microprocessor 100 conforming to the RISC-V ISA, as described in specifications set forth in Volumes I and II of "The RISC-V Instruction Set Manual," Document Version 20191213, promulgated by the RISC-V Foundation. These two volumes are herein incorporated by reference for all purposes. However, the embodiments of the SCA mitigation techniques are not generally limited to RISC-V.

The core 100 has an instruction pipeline 140 that includes a front-end 110, mid-end 120, and back-end 130. The front-end 110 includes an instruction cache 101, a predict unit (PRU) 102, a fetch block descriptor (FBD) FIFO 104, an instruction fetch unit (IFU) 106, and a fetch block (FBlk) FIFO 108. The mid-end 120 include a decode unit (DEC) 112.

The back-end 130 includes a data cache 103, register files 105, a plurality of execution units (EU) 114, and load and store queues (LSQ) 125. In one embodiment, the register files 105 include an integer register file, a floating-point register file and a vector register file. In one embodiment, the register files 105 include both architectural registers as well as micro-architectural registers. In one embodiment, the EUs 114 include integer execution units (IXU) 115, floating point units (FXU) 119, and a load-store unit (LSU) 117. The LSQ 125 hold speculatively executed load/store micro-operations, or load/store Ops, until the Op is committed. More specifically, the load queue 125 holds a load operation until it is committed, and the store queue 125 holds a store operation until it is committed. The store queue 125 may also forward store data that it holds to other dependent load Ops. When a load/store Op is committed, the load queue 125 and store queue 125 may be used to check for store forwarding violations. When a store Op is committed, the store data held in the associated store queue 125 entry is written into the data cache 103 at the store address held in the store queue 125 entry. In one embodiment, the load and store queues 125 are combined into a single memory queue structure rather than separate queues. The DEC 112 allocates an entry of the LSQ 125 in response to decode of a load/store instruction.

The core 100 also includes a memory management unit (MMU) 147 coupled to the IFU 106 and LSU 117. The MMU 147 includes a data translation lookaside buffer (DTLB) 141, an instruction translation lookaside buffer (ITLB) 143, and a table walk engine (TWE) 145. In one embodiment, the core 100 also includes a memory dependence predictor (MDP) 111 coupled to the DEC 112 and LSU 117. The MDP 111 makes store dependence predictions that indicate whether store-to-load forwarding should be performed. The microprocessor 110 may also include other blocks not shown, such as a write combining buffer, a load buffer, a bus interface unit, and various levels of cache memory above the instruction cache 101 and data cache 103, some of which may be shared by other cores of the processor. Furthermore, the core 100 may be multi-threaded in the sense that it includes the ability to hold architectural state (e.g., program counter, architectural registers) for multiple threads that share the back-end 130, and in some embodiments the mid-end 120 and front-end 110, to perform simultaneous multithreading (SMT).

The core 100 provides virtual memory support. Each process, or thread, running on the core 100 may have its own address space identified by an address space identifier (ASID). The core 100 may use the ASID to perform address translation. For example, the ASID may be associated with the page tables of a process. The TLBs (e.g., DTLB 141 and ITLB 143) may include the ASID in their tags in order to distinguish entries for different processes. In the x86 ISA, for example, an ASID may correspond to a processor context identifier (PCID). The core 100 also provides machine virtualization support. Each virtual machine running on the core 100 may have its own virtual machine identifier (VMID). The TLBs may include the VMID in their tags in order to distinguish entries for different virtual machines. Finally, the core 100 provides different privilege modes (PM), or privilege levels. The PM of the core 100 determines, among other things, whether or not privileged instructions may be executed. For example, in the x86 ISA there are four PMs, commonly referred to as Ring 0 through Ring 3. Ring 0 is also referred to as Supervisor level and Ring 3 is also referred to as User level, which are the two most commonly used PMs. For another example, in the RISC-V ISA, PMs may include Machine (M), User (U), Supervisor (S) or Hypervisor Supervisor (HS), Virtual User (VU), and Virtual Supervisor (VS). In the RISC-V ISA, the S PM exists only in a core without virtualization supported or enabled, whereas the HS PM exists when virtualization is enabled, such that S and HS are essentially non-distinct PMs. For yet another example, the ARM ISA includes exception levels (EL0, EL1, EL2 and EL3).

As used herein and as shown in FIG. 1, a translation context (TC) of the core 100 (or of a hardware thread in the case of a multi-threaded core) is a function of the ASID, VMID, and/or PM or TR of the processor. The data cache 103 may be in accordance with embodiments of the data cache memory 103, described below with respects to the remaining Figures, that uses the TC to prevent entries of the data cache memory 103 allocated under one TC from being accessible during execution under another TC to mitigate SCAs. More specifically, embodiments are described in which the TC is included in the tag of entries of the data cache memory 103 and/or in the set index into the data cache memory 103.

A translation regime (TR) is based on the PM. In one embodiment, the TR indicates whether address translation is off (e.g., M mode) or on, whether one level of address translation is needed (e.g., U mode, S mode and HS mode) or two levels of address translation is needed (VU mode and VS mode), and what form of translation table scheme is involved. For example, in a RISC-V embodiment, the U and S privilege modes (or U and HS, when the hypervisor extension is active) may share a first TR in which one level of translation is required based on the ASID, VU and VS share a second TR in which two levels of translation are required based on the ASID and VMID, and M privilege level constitutes a third TR in which no translation is performed, i.e., all addresses are physical addresses.

Pipeline control logic (PCL) 132 is coupled to and controls various aspects of the pipeline 140 which are described in detail herein. The PCL 132 includes a ReOrder Buffer (ROB) 122, interrupt handling logic 149, abort and exception-handling logic 134, and control and status registers (CSR) 123. The CSRs 123 hold, among other things, the PM 199, VMID 197, and ASID 195 of the core 100, or one or more functional dependencies thereof (such as the TR and/or TC). In one embodiment (e.g., in the RISC-V ISA), the current PM 199 does not reside in a software-visible CSR 123; rather, the PM 199 resides in a micro-architectural register. However, the previous PM 199 is readable by a software read of a CSR 123 in certain circumstances, such as upon taking of an exception. In one embodiment, the CSRs 123 may hold a VMID 197 and ASID 195 for each TR or PM.

As shown in FIG. 1, various units of the pipeline 140 (e.g., PRU 102, IFU 106, DEC 112, EUs 114) may signal a TC-changing event to the PCL 132. In response, the PCL 132 may assert stall signals to selectively stall the units in order to prevent speculative execution of instructions dependent in their execution on the new TC until instructions dependent in their execution on the old/current TC have completed execution.

Additionally, the PCL 132 may assert flush signals to selectively flush instructions/Ops from the various units of the pipeline 140, as described herein. Additionally, the pipeline units may signal a need for an abort, as described in more detail below, e.g., in response to detection of a mis-prediction or other microarchitectural exception, architectural exception, or interruption. Conventionally, exceptions are categorized as either faults, traps, or aborts. The term "abort" as used herein is not limited by the conventional categorization of exceptions. As used herein, "abort" is a microarchitectural mechanism used to flush instructions from the pipeline 140 for many purposes, which encompasses interrupts, faults and traps. Purposes of aborts include recovering from microarchitectural hazards such as a branch mis-prediction or a store-to-load forwarding violation. The microarchitectural abort mechanism is also used for architecturally defined cases where changing the privilege mode requires strong in-order synchronization to mitigate SCAs. In one embodiment, the back-end 130 of the processor 100 operates under a single PM, while the PM for the front-end 110 and mid-end 120 may change (e.g., in response to a PM-changing instruction) while older instructions under an older PM continue to drain out of the back-end 130. Other blocks of the core 100, e.g., DEC 112, may maintain shadow copies of various CSRs 123 in order to perform their operations.

The PRU 102 maintains the program counter (PC) and includes predictors that predict program flow that may be altered by control flow instructions, such as branch instructions. In one embodiment, the PRU 102 includes a next index predictor (NIP), a branch target buffer (BTB), a main conditional branch predictor (CBP), a secondary conditional branch predictor (BMP), an indirect branch predictor (IBP), and a return address predictor (RAP). As a result of predictions made by the predictors, the core 100 may speculatively execute instructions in the instruction stream of the predicted path.

The PRU 102 generates fetch block descriptors (FBD) that are provided to the FBD FIFO 104 in a first-in-first-out manner. Each FBD describes a fetch block (FBlk or FB). An FBlk is a sequential set of instructions. In one embodiment, an FBlk is up to sixty-four bytes long and may contain as many as thirty-two instructions. An FBlk ends with either a branch instruction to be predicted, an instruction that causes a PM change or that requires heavy abort-based synchronization (aka "stop" instruction), or an indication that the run of instructions continues sequentially into the next FBlk. An FBD is essentially a request to fetch instructions. An FBD may include the address and length of an FBlk and an indication of the type of the last instruction. The IFU 106 uses the FBDs to fetch FBlks into the FBlk FIFO 108, which feeds fetched instructions to the DEC 112. The FBD FIFO 104 enables the PRU 102 to continue predicting FBDs to reduce the likelihood of starvation of the IFU 106. Likewise, the FBlk FIFO 108 enables the IFU 106 to continue fetching FBlks to reduce the likelihood of starvation of the DEC 112. The core 100 processes FBlks one at a time, i.e., FBlks are not merged or concatenated. By design, the last instruction of an FBlk can be a branch instruction, a privilege-mode-changing instruction, or a stop instruction. Instructions may travel through the pipeline 140 from the IFU 106 to the DEC 112 as FBlks, where they are decoded in parallel.

The DEC 112 decodes architectural instructions of the FBlks into micro-operations, referred to herein as Ops. The DEC 112 dispatches Ops to the schedulers 121 of the EUs 114. The schedulers 121 schedule and issue the Ops for execution to the execution pipelines of the EUs, e.g., IXU 115, FXU 119, LSU 117. The EUs 114 receive operands for the Ops from multiple sources including: results produced by the EUs 114 that are directly forwarded on forwarding busses back to the EUs 114 and operands from the register files 105 that store the state of architectural registers as well as microarchitectural registers, e.g., renamed registers. In one embodiment, the EUs 114 include four IXU 115 for executing up to four Ops in parallel, two FXU 119, and an LSU 117 that is capable of executing up to four load/store Ops in parallel. The instructions are received by the DEC 112 in program order, and entries in the ROB 122 are allocated for the associated Ops of the instructions in program order. However, once dispatched by the DEC 112 to the EUs 114, the schedulers 121 may issue the Ops to the individual EU 114 pipelines for execution out of program order.

The PRU 102, IFU 106, DEC 112, and EUs 114, along with the intervening FIFOs 104 and 108, form a concatenated pipeline 140 in which instructions and Ops are processed in mostly sequential stages, advancing each clock cycle from one stage to the next. Each stage works on different instructions in parallel. The ROB 122 and the schedulers 121 together enable the sequence of Ops and associated instructions to be rearranged into a data-flow order and to be executed in that order rather than program order, which may minimize idling of EUs 114 while waiting for an instruction requiring multiple clock cycles to complete, e.g., a floating-point Op or cache-missing load Op.

Many structures within the core 100 address, buffer, or store information for an instruction or Op by reference to an FBlk identifier. In one embodiment, checkpoints for abort recovery are generated for and allocated to FBlks, and the abort recovery process may begin at the first instruction of the FBlk containing the abort-causing instruction.

In one embodiment, the DEC 112 converts each FBlk into a series of up to eight OpGroups. Each OpGroup consists of either four sequential Ops or, if there are fewer than four Ops in the FBlk after all possible four-op OpGroups for an FBlk have been formed, the remaining Ops of the FBlk. Ops from different FBlks are not concatenated together into the same OpGroup. Because some Ops can be fused from two instructions, an OpGroup may correspond to up to eight instructions. The Ops of the OpGroup may be processed in simultaneous clock cycles through later DEC 112 pipe stages, including rename and dispatch to the EU 114 pipelines. In one embodiment, the MDP 111 provides up to four predictions per cycle, each corresponding to the Ops of a single OpGroup. Instructions of an OpGroup are also allocated into the ROB 122 in simultaneous clock cycles and in program order. The instructions of an OpGroup are not, however, necessarily scheduled for execution together.

In one embodiment, each of the EUs 114 includes a dedicated scheduler 121. In an alternate embodiment, a scheduler 121 common to all of the EUs 114 (and integrated with the ROB 122 according to one embodiment) serves all of the EUs 114. In one embodiment, each scheduler 121 includes an associated buffer (not shown) that receives Ops dispatched by the DEC 112 until the scheduler 121 issues the Op to the relevant EU 114 pipeline for execution, namely when all source operands upon which the Op depends are available for execution and an EU 114 pipeline of the appropriate type to execute the Op is available.

The PRU 102, IFU 106, DEC 112, each of the execution units 114, and PCL 132, as well as other structures of the core 100, may each have their own pipeline stages in which different operations are performed. For example, in one embodiment, the DEC 112 has a pre-decode stage, an extract stage, a rename stage, and a dispatch stage.

The PCL 132 tracks instructions and the Ops into which they are decoded throughout their lifetime. The ROB 122 supports out-of-order instruction execution by tracking Ops from the time they are dispatched from DEC 112 to the time they retire. In one embodiment, the ROB 122 has entries managed as a FIFO, and the ROB 122 may allocate up to four new entries per cycle at the dispatch stage of the DEC 112 and may deallocate up to four oldest entries per cycle at Op retire. In one embodiment, each ROB entry includes an indicator that indicates whether the Op has completed its execution and another indicator that indicates whether the result of the Op has been committed to architectural state. More specifically, load and store Ops may be committed subsequent to completion of their execution. Still further, an Op may be committed before it is retired. Because the ROB 122 retires all Ops and their associated instructions in program order, some Ops may complete execution many cycles before they can be retired or aborted, e.g., a speculatively executed instruction that must be aborted due to detection of a mis-prediction. For example, a speculatively executed instruction that loads a secret data byte could complete before the processor detects a mis-prediction. For another example, a speculatively executed instruction that uses the secret data byte value to modify a previously flushed cache that becomes a side channel to be probed by an SCA to detect the secret data byte could complete before the processor detects the mis-prediction. However, advantageously, embodiments are described in which the data cache memory 103 uses the TC to cause an access operating under one TC to miss entries created under another TC even though they use the same memory address.

A TC-changing instruction may change the PM or TR, the ASID, and/or the VMID according to different embodiments, as described above. Such an instruction may explicitly or implicitly update one or more of the PM 199 or TR 198, VMID 197 and/or ASID 195 to accomplish the TC change. Examples of TC-changing instructions include, but are not limited to, a system call or return from system call instruction, a software interrupt, an instruction that enters or exits a virtual machine, an instruction that changes the ASID, VMID, PM or TR, etc. In one embodiment, a TC-changing instruction may write to a CSR 123 that holds the base address of the page table structure, e.g., in the RISC-V ISA, the SATP register associated with the current translation regime.

Examples of exceptions may include architectural exceptions such as, but not limited to an invalid opcode fault, debug breakpoint, or illegal instruction fault (e.g., insufficient privilege mode) that may be detected by the DEC 112, a page fault or access fault that may be detected by the LSU 117, and an attempt to fetch an instruction from a non-executable page or a page the current process does not have permission to access that may be detected by the IFU 106. Examples of exceptions may also include microarchitectural exceptions such as, but not limited to, a detection of a mis-prediction, e.g., by a branch predictor of a direction or target address of a branch instruction, or of a mis-prediction that store data should be forwarded to a load Op in response to a store dependence prediction, e.g., by the MDP 111. As described herein, the predictions made by the predictors may give rise to speculative execution, which provides the opportunity for SCAs.

Figure 2:
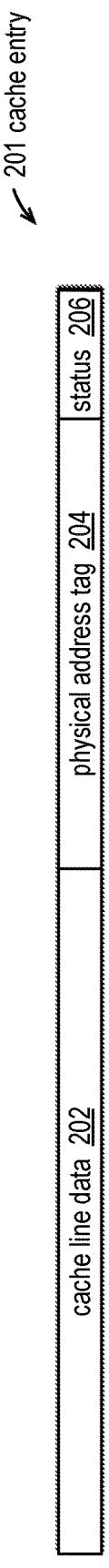
FIG. 2 is an example block diagram of a cache entry of the data cache memory of FIG. 1 in accordance with embodiments of the present disclosure.

FIG. 2 is an example block diagram of a cache entry 201 of data cache memory 103 of FIG. 1 in accordance with embodiments of the present disclosure. The cache entry 201 includes cache line data 202, a physical address tag 204, and a status field 206. The cache line data 202 is the copy of the data brought into the cache memory from system memory, in some embodiments indirectly through a higher level of the cache memory hierarchy. The status 206 indicates the state of the cache line. More specifically, the status 206 indicates whether the cache line data is valid or invalid. Typically, the status 206 also indicates whether the cache line has been modified since it was brought into the cache memory. The status 206 may also indicate whether the cache line is exclusively held by the cache memory or whether the cache line is shared by other cache memories in the system. An example protocol used to maintain cache coherency defines four possible states for a cache line: Modified, Exclusive, Shared, Invalid (MESI).

The physical address tag 204 is upper bits (e.g., tag bits 404*a* of FIG. 4) of the physical memory address (e.g., physical address 404 of FIG. 4) specified by the operation that brought the cache line into the data cache 103, e.g., the physical memory address specified by a load/store operation. That is, when an entry in the data cache 103 is allocated, the tag bits 404*a* of the physical memory address 404 are written to the physical address tag 204 of the entry. When the data cache 103 is subsequently accessed (e.g., by a subsequent load/store operation), the physical address tag 204 is used to determine whether the access hits in the data cache 103. Generally speaking, the data cache 103 uses lower bits (e.g., index bits 404*b* of FIG. 4) of the physical memory address to index into the data cache 103 and uses the remaining bits of the address above the index bits as the tag bits. To illustrate by way of example, assume a 64 kilobyte (KB) data cache memory 103 arranged as a 4-way set associative cache having 64-byte cache lines; physical address bits [5:0] are an offset into the cache line, physical address bits [13:6] (index bits) are used as the set index, and physical address bits [N−1:14] (tag bits) are used as the tag, where N is the number of bits of the physical memory address.

As may be inferred from the forgoing, when a cache entry similar to the cache entry 201 of FIG. 2 is used in a conventional data cache memory design, if the attacker generates an access with the same physical memory address that was used by the victim to allocate the implicated cache line into the cache, the attacker will experience a hit in the cache and be able to detect the time of the access was short relative to a cache miss time. This can make a conventional cache a side channel susceptible to an SCA. To address this susceptibility, embodiments of a data cache entry (e.g., entry 301 of FIG. 3) that also includes TC information in its tag field (e.g., tag field 304 of FIG. 3) are described in more detail below. Furthermore, embodiments are described herein (e.g., of FIGS. 9 through 16) that use the TC information to generate the data cache 103 set index and are thus able to use the TC-less entry 201 of FIG. 2 to mitigate SCAs as described herein.

Figure 3:
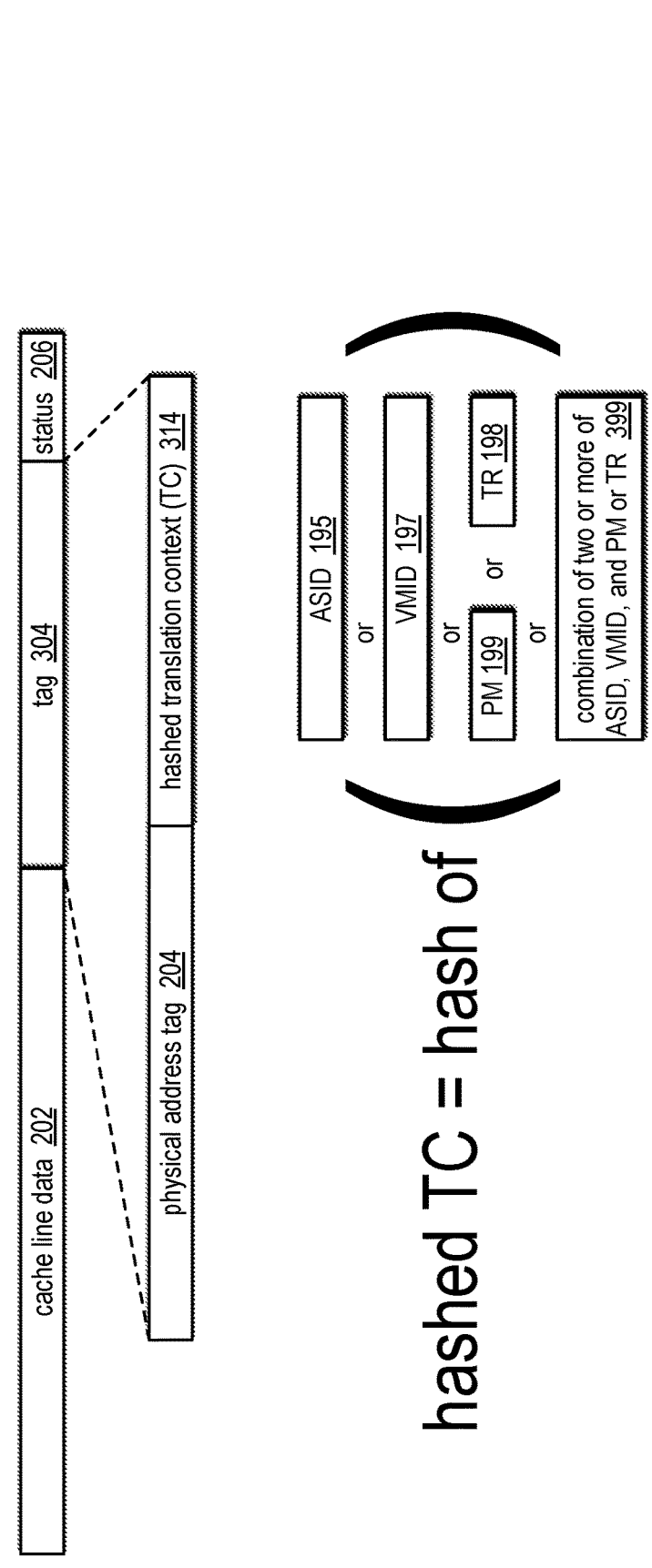
FIG. 3 is an example block diagram of a cache entry of the data cache memory of FIG. 1 that includes translation context information in its tag to mitigate SCAs in accordance with embodiments of the present disclosure.

FIG. 3 is an example block diagram of a cache entry 301 of data cache memory 103 of FIG. 1 that includes translation context information in its tag to mitigate SCAs in accordance with embodiments of the present disclosure. More specifically, the entry 301 of FIG. 3 is similar to the entry 201 of FIG. 2 except the tag 304 of entry 301 includes two portions: the physical address tag 204 portion (as of FIG. 2) and a hashed translation context (TC) 314 portion. The hashed TC 314 is a hash of the TC. For example, in the embodiment of FIG. 4, the hashed TC 314 are the hashed TC tag bits 421. That is, the TC is an input to a hash function (e.g., performed by TC hash logic 412 of FIG. 4) that outputs the hashed TC 314. The hash function performs a logical and/or arithmetic operation on its input bits to generate output bits. For example, in one embodiment, the hash function is a logical exclusive-OR on at least a portion of the TC bits. In one embodiment, the hash function is a pass-through function, i.e., the TC bits are passed through directly to the output such that all the TC bits are included in the hashed TC 314. The number of output bits of the hash function is the size of the hashed TC 314 field of the data cache entry 301. For example, if the hashed TC 314 size is eight bits, then the output of the hash function is eight bits. The hash functions performed by other hashing logic described herein may have similar properties, e.g., tag hash logic 712 of FIG. 7 and TC hash logic 914 of FIG. 9. The TC is a function of the ASID 195, VMID 197 and/or PM 199 or TR 198. In one embodiment, the TC is the ASID 195. In one embodiment, the TC is the VMID 197. In one embodiment, the TC is the PM 199. In one embodiment, the TC is the TR 198. In one embodiment, the TC is a combination (399 of FIG. 3) of two or more of the ASID 195, the VMID 197, and the PM 199 or the TR 198. That is, in one embodiment, the TC is a combination of the ASID 195 and VMID 197; in one embodiment, the TC is a combination of the ASID 195 and PM 199; in one embodiment, the TC is a combination of the ASID 195 and TR 198; in one embodiment, the TC is a combination of the VMID 197 and PM 199; in one embodiment, the TC is a combination of the VMID 197 and TR 198; in one embodiment, the TC is a combination of the ASID 195, VMID 197 and PM 199; and in one embodiment, the TC is a combination of the ASID 195, VMID 197 and TR 198. Advantageously, by including the hashed TC 314 in the tag 304 of the entry 301, SCAs may be mitigated because an attacker memory access executing with a TC different from the TC of the victim memory access that allocated the entry will experience a miss in the data cache memory 103 rather than a hit, as described in more detail below.

Figure 4:
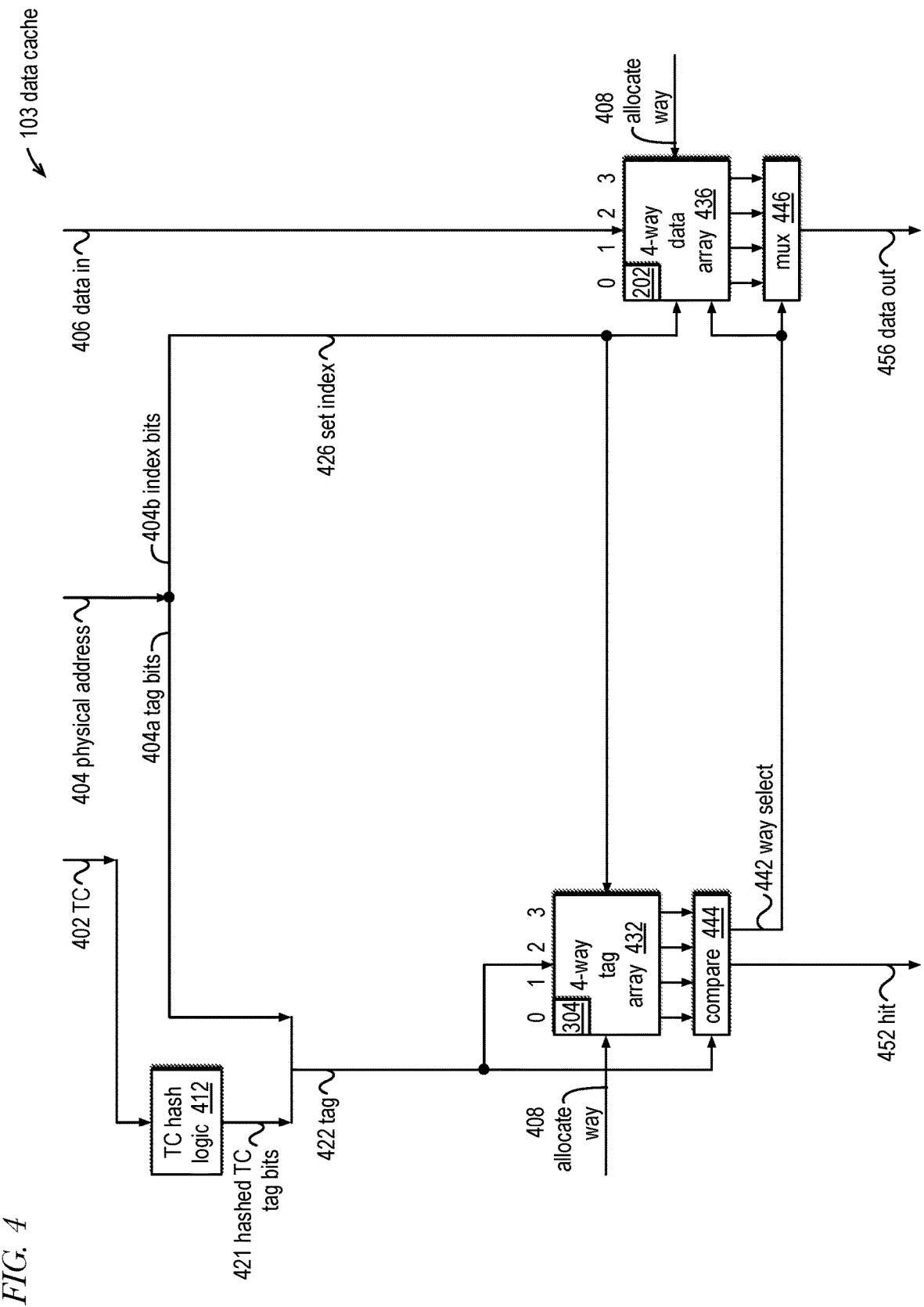
FIG. 4 is an example block diagram illustrating the data cache memory of FIG. 1 in accordance with embodiments of the present disclosure.

FIG. 4 is an example block diagram illustrating the data cache memory 103 of FIG. 1 in accordance with embodiments of the present disclosure. The data cache memory 103 includes a tag array 432, a data array 436, a comparator 444, a multiplexer 446 and TC hash logic 412. The data cache memory 103 also includes a TC input 402, a physical memory address input 404, a data in input 406 and an allocate way input 408. The TC hash logic 412 hashes the TC 402 to generate hashed TC tag bits 421. In one embodiment, the TC 402 is the ASID 195. In one embodiment, the TC 402 is the VMID 197. In one embodiment, the TC 402 is the PM 199. In one embodiment, the TC 402 is the TR 198. In one embodiment, the TC 402 is a combination (399 of FIG. 3) of two or more of the ASID 195, the VMID 197, and the PM 199 or the TR 198. That is, in one embodiment, the TC 402 is a combination of the ASID 195 and VMID 197; in one embodiment, the TC 402 is a combination of the ASID 195 and PM 199; in one embodiment, the TC 402 is a combination of the ASID 195 and TR 198; in one embodiment, the TC 402 is a combination of the VMID 197 and PM 199; in one embodiment, the TC 402 is a combination of the VMID 197 and TR 198; in one embodiment, the TC 402 is a combination of the ASID 195, VMID 197 and PM 199; and in one embodiment, the TC 402 is a combination of the ASID 195, VMID 197 and TR 198.

The data cache memory 103 also includes a hit output 452 and a data out output 456. The tag array 432 and data array 436 are random access memory arrays. In the embodiment of FIG. 4, the data cache memory 103 is arranged as a 4-way set associative cache; hence, the tag array 432 and data array 436 are arranged as 4-way set associative memory arrays. However, other embodiments are contemplated in which the associativity has a different number of ways than four, including direct-mapped and fully associative embodiments.

In the embodiment of FIG. 4, each entry of the data cache memory 103 is structured as the entry 301 of FIG. 3, having cache line data 202, tag 304 and status 206 portions. The data array 436 holds the cache line data 202 associated with each of the entries 301 of the data cache memory 103. The tag array 432 holds the tag 304 associated with each of the entries 301 of the data cache memory 103. In one embodiment, the status 206 of each entry is also stored in the tag array 432, whereas in another embodiment the data cache memory 103 includes a separate memory array for storing the status 206 of the entries. Although in the embodiment of FIG. 4 the data array 436 and tag array 432 are separate, other embodiments are contemplated in which the data and tag (and status) reside in the same memory array.

A tag 422 is formed as the concatenation of the hashed TC tag bits 421 and the tag bits 404a of the physical memory address 404. The tag 422 is provided as an input to the tag array 432 for writing into the tag 304 field of the selected entry of the tag array 432, e.g., during an allocation. The set index 426 selects the set of entries. In the case of an allocation, the tag 422 is written into the tag 304 of the entry of the way selected by the allocate way input 408 of the selected set. In the case of an access, the comparator 444 compares the tag 422 with each of the tags 304 of the selected set. If there is a valid match, the hit signal 452 is true and the way select 442 indicates the matching way; otherwise, the hit signal 452 is false.

The data array 436 receives the data in input 406 for writing into the cache line data 202 field of the selected entry of the data array 436, e.g., during a cache line allocation or a store operation. The set index 426 selects the set of entries. In the embodiment of FIG. 4, the set index 426 is the index bits 404b of the physical memory address 404. In the case of an allocation, the way of the selected set is selected by the allocate way input 408, and in the case of a memory access operation (e.g., load/store operation) the way is selected by the way select signal 442. In the case of a read operation (e.g., load operation), the mux 446 receives the cache line data 202 of all four ways and selects one of the ways based on the way select signal 442, and the cache line data 202 selected by the mux 446 is provided on the data out output 456.

FIG. 5A is an example flowchart illustrating an operation to allocate an entry into the data cache memory 103 of FIG. 4 in accordance with embodiments of the present disclosure. Operation begins at block 502.

At block 502, the data cache memory 103 receives an allocation operation that includes the TC input 402, the physical memory address input 404, the data in input 406, and the allocate way input 408. Operation proceeds to block 504.

At block 504, the set index 426 selects a set of entries of the data array 436 and tag array 432. Operation proceeds to block 506.

At block 506, the tag 422 is formed by inclusion of the hashed TC tag bits 421 and the tag bits 404a of the physical memory address 404. Operation proceeds to block 508.

At block 508, the tag 422 is written to the tag 304 of the entry of the way of the tag array 432 selected by the allocate way input 408 of the set selected by the set index 426. Additionally, the cache line on the data in bus 406 is written to the cache line data 202 of the entry of the way of the data array 436 selected by the allocate way input 408 of the set selected by the set index 426.

FIG. 5B is a flowchart illustrating an operation to access the data cache memory 103 of FIG. 4 in accordance with embodiments of the present disclosure. Operation begins at block 512.

At block 512, the data cache memory 103 receives an allocation operation that includes the TC input 402, the physical memory address input 404, and the data in input 406 in the case of a store operation. Operation proceeds to block 514.

At block 514, the set index 426 selects a set of entries of the data array 436 and tag array 432. Operation proceeds to block 516.

At block 516, the tag 422 is formed by inclusion of the hashed TC tag bits 421 and the tag bits 404a of the physical memory address 404. Operation proceeds to block 518.

At block 518, the tag 422 is compared by the comparator 444 with the tag 304 of each entry of the four ways of the set selected by the set index 426 to make a hit determination (indicated on hit signal 452) and to generate the way select 442. Operation proceeds to block 522.

At block 522, if a hit is detected (i.e., hit signal 452 is true) and the operation was a load operation, the way select 442 controls the mux 446 to select one of the ways of the selected set of the data array 436 to provide the cache line data 202 of the selected entry on the data out bus 456. If a hit is detected and the operation was a store operation, the way select 442 selects one of the ways of the selected set of the data array 436 for writing the store data 406 to the cache line data 202 of the selected entry.

As may be observed from the description of FIGS. 4, 5A and 5B, because a hash of the TC 402 of the allocation is included in the tag 422 that is written to the tag 304 of the allocated entry 301, a subsequent access to the same value of the physical memory address 404 will hit on the allocated entry 301 only if the hash of the TC 402 value of the subsequent access is the same. Thus, advantageously, if an SCA attacker has a different TC 402 than the victim that allocated the entry, the attacker access will likely experience a miss even though the attacker accesses the same physical memory address 404. The likelihood may be a function of the composition of the TC 402 (i.e., which of the ASID 195, VMID 197, and PM 199 or TR 198 are included in the TC 402), the amount of bits of the TC 402 included in the hash, the size of the hashed TC tag bits 421, and the hash function used.

FIG. 6 is an example block diagram of a cache entry 301 that includes translation context information in its tag and that also includes a small hashed tag that includes translation context information in accordance with embodiments of the present disclosure. The cache entry 301 of FIG. 6 is similar in many respects to the cache entry 301 of FIG. 3 and like-numbered elements are similar. However, the cache entry 301 of FIG. 6 also includes a hashed tag field 608. As described in more detail below, the hashed tag 608 is a hash of the TC 402 and the tag bits 404a of the physical memory address 404. Advantageously, the hashed tag 608 may be used to generate a predicted early miss indication and may be used to generate a predicted early way select signal.

Figure 7:
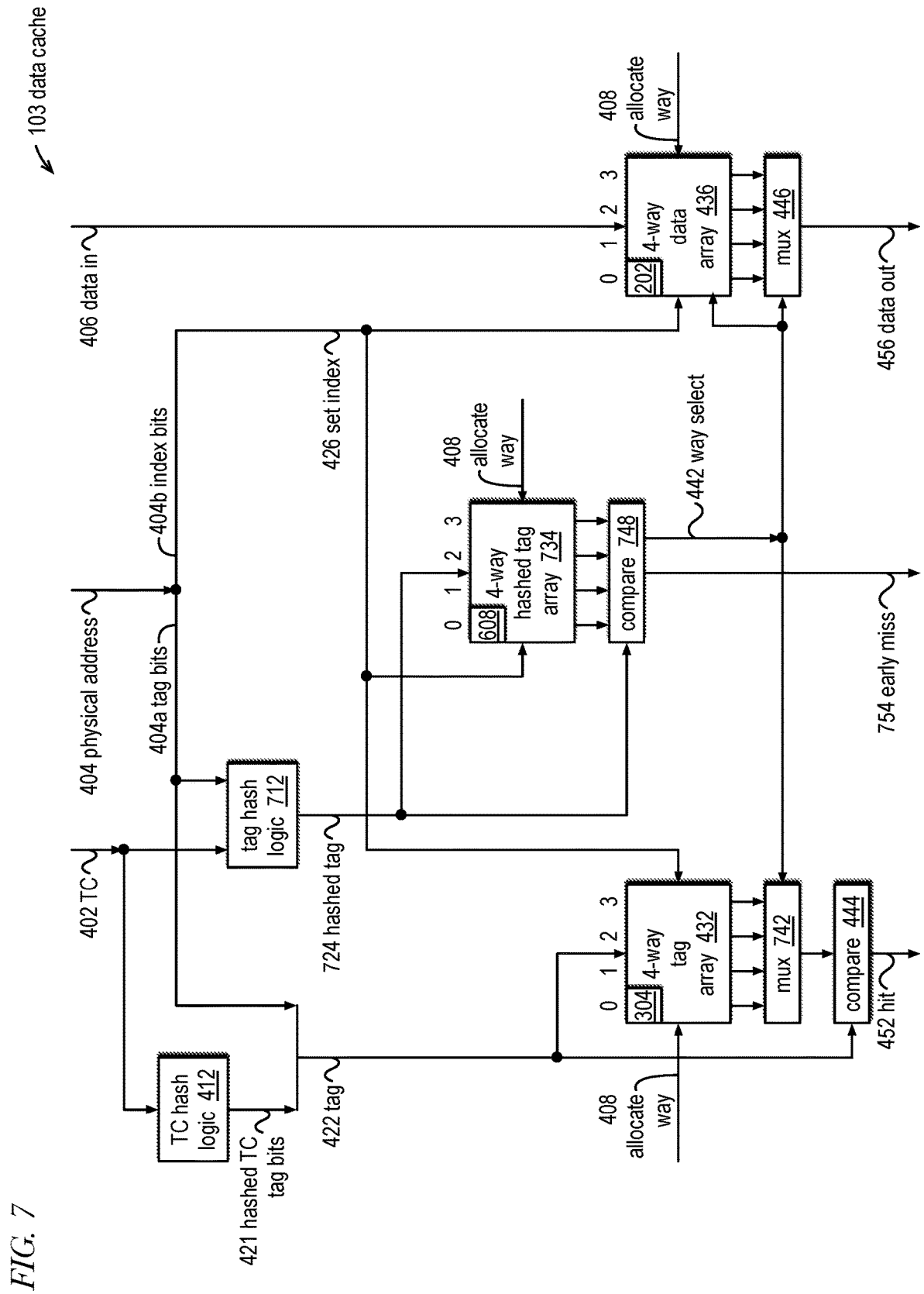
FIG. 7 is an example block diagram illustrating the data cache memory of FIG. 1 in accordance with embodiments of the present disclosure.

FIG. 7 is an example block diagram illustrating the data cache memory 103 of FIG. 1 in accordance with embodiments of the present disclosure. The data cache memory 103 of FIG. 7 is similar in many respects to the data cache memory 103 of FIG. 4 and like-numbered elements are similar. However, the data cache memory 103 of FIG. 7 also includes tag hash logic 712, a hashed tag array 734, a second comparator 748, a second mux 742, and an early miss indicator 754. The hashed tag array 734 is arranged with the same number of sets and ways as the tag array 432 and data array 436.

The tag hash logic 712 hashes the TC 402, or any part thereof, and the tag bits 404a, or any part thereof, to generate the hashed tag 724. The hashed tag array 734 holds the hashed tag 608 associated with each of the entries 301 of FIG. 6 of the data cache memory 103. The hashed tag 724 is provided as an input to the hashed tag array 734 for writing into the hashed tag 608 of the selected entry of the hashed tag array 734, e.g., during an allocation. The set index 426 selects the set of entries of the hashed tag array 734. In the case of an allocation, the hashed tag 724 is written into the hashed tag 608 of the entry of the way selected by the allocate way input 408 of the selected set. In the case of an access, comparator 748 compares the hashed tag 724 with each of the hashed tags 608 of the selected set. If there is a valid match, the early miss signal 754 is false and the way select 442 indicates the matching way; otherwise, the early miss signal 754 is true.

The way select 442 is provided to both mux 446 and to mux 742. In the case of a read operation, mux 742 receives the tag 304 of all four ways and selects one of the ways based on the way select signal 442. The tag 304 selected by mux 742 is compared by comparator 444 with the tag 422. If there is a valid match, the hit signal 452 is true; otherwise, the hit signal 452 is false.

Because the hashed tag 724 and the hashed tags 608 are small (e.g., 16 bits as an illustrative example) relative to the tag 422 and tags 304 (e.g., 54 bits as an illustrative example), the comparison performed by comparator 748 may be faster than the comparison performed by comparator 444 of FIG. 4, for example. Therefore, the way select 442 of FIG. 7 may be signaled by an earlier stage in the data cache memory 103 pipeline than the stage of the pipeline that signals the way select 442 of FIG. 4, for example. This may be advantageous because it may shorten the time to data out 456.

Additionally, the early miss 754 may be signaled by an earlier stage than the stage that signals the hit indicator 452. This may be advantageous because it may enable earlier filling of a missing cache line. It is noted that due to the nature of the hashed tag 724, if the early miss indicator 754 indicates a false value, i.e., indicates a hit, the hit indication may be incorrect, i.e., the hit indicator 452 may subsequently indicate a false value, i.e., a miss. Thus, the early miss indicator 754 is a prediction, not necessarily a correct miss indicator. This is because differing pairs of TC 402 and tag bits 404a may hash to the same value. For example, a TC value of X and an address tag value of A may hash to the same value as a TC value of Y and an address tag value of B. However, if the early miss indicator 754 indicates a true value, i.e., indicates a miss, the miss indication is correct, i.e., the hit indicator 452 will also indicate a miss, i.e., will indicate a false value. This is because if two hash results are not equal (assuming they were hashed using the same hash algorithm), then they could not have been generated from equal inputs, i.e., matching inputs.

Figure 8A:
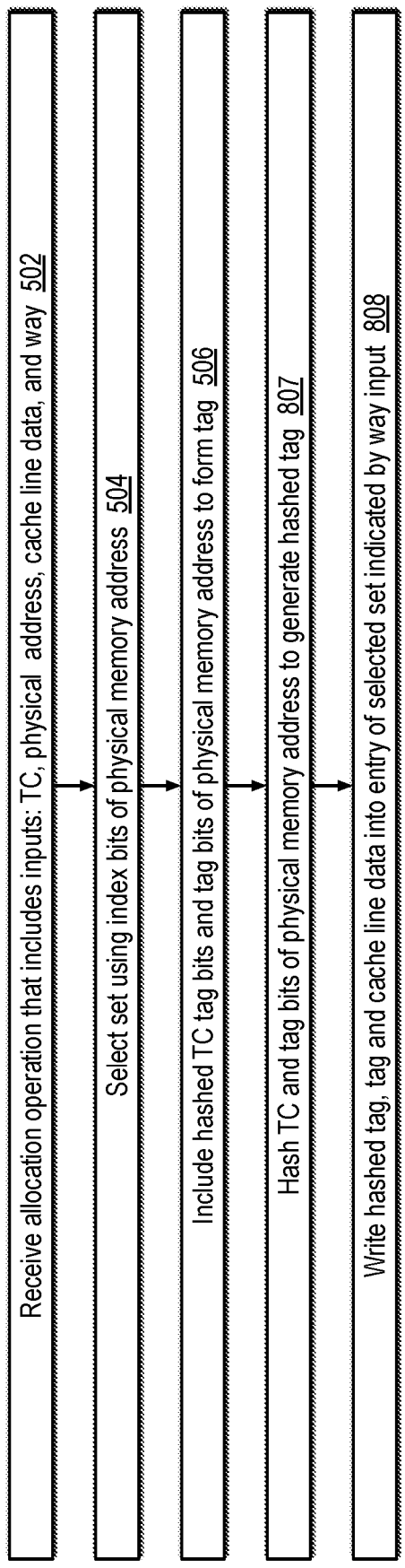
FIG. 8A is an example flowchart illustrating an operation to allocate an entry into the data cache memory of FIG. 7 in accordance with embodiments of the present disclosure.

FIG. 8A is an example flowchart illustrating an operation to allocate an entry into the data cache memory 103 of FIG. 7 in accordance with embodiments of the present disclosure. Operation begins at block 502 and then proceeds to block 504 and then proceeds to block 506 as in FIG. 5A and then proceeds to block 807.

At block 807, the TC 402 and tag bits 404a are hashed by tag hash logic 712 to generate the hashed tag 724. In one embodiment, the hash operation performed by the tag hash logic 712 is an exclusive-OR (XOR) of bits of the TC 402 and the tag bits 404a in a predetermined arrangement to generate the number of bits that is the width of the hashed tag 724. Operation proceeds to block 808.

At block 808, the tag 422 is written to the tag 304 of the entry of the way of the tag array 432 selected by the allocate way input 408 of the set selected by the set index 426. Additionally, the cache line on the data in bus 406 is written to the cache line data 202 of the entry of the way of the data array 436 selected by the allocate way input 408 of the set selected by the set index 426. Still further, the hashed tag 724 is written to the hashed tag 608 of the entry of the way of the hashed tag array 734 selected by the allocate way input 408 of the set selected by the set index 426.

Figure 8B:
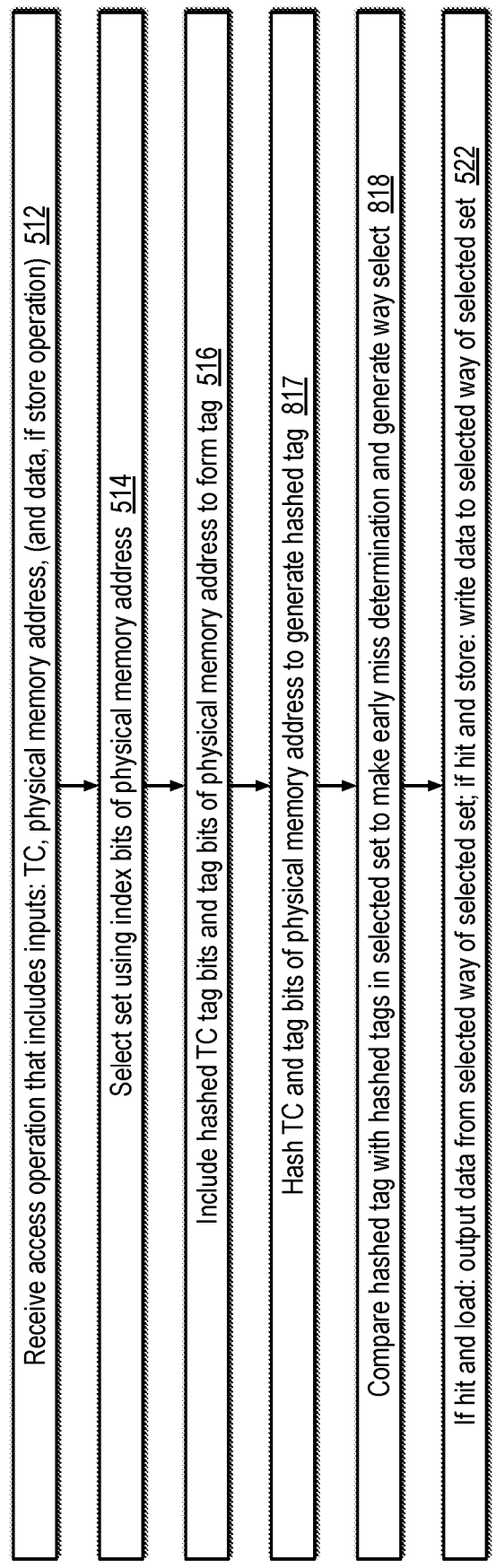
FIG. 8B is an example flowchart illustrating an operation to access the data cache memory of FIG. 7 in accordance with embodiments of the present disclosure.

FIG. 8B is an example flowchart illustrating an operation to access the data cache memory 103 of FIG. 7 in accordance with embodiments of the present disclosure. Operation begins at block 512 then proceeds to block 514 then proceeds to block 516 as in FIG. 5B and then proceeds to block 817.

At block 817, the TC 402 and tag bits 404a are hashed by tag hash logic 712 to generate the hashed tag 724. Operation proceeds to block 818.

At block 818, the hashed tag 724 is compared by comparator 748 with the hashed tag 608 of each entry of the four ways of the set selected by the set index 426 to make an early miss determination (indicated on early miss signal 754) and to generate the way select 442. Operation proceeds to block 522 as in FIG. 5B.

As may be observed from the description of FIGS. 7, 8A and 8B, because the early miss 754 and way select 442 may be signaled earlier than the hit 452 and way select 442 of the embodiment of FIG. 4, advantageously the time to data out 456 may be shortened, and the filling of a missing cache line may be initiated earlier. Additionally, as with the embodiment of FIG. 4, because a hash of the value of the TC 402 of the allocation is included in the tag 422 that is written to the tag 304 of the allocated entry 301, a subsequent access to the same value of the physical memory address 404 will hit on the allocated entry 301 only if the hash of the TC 402 value of the subsequent access is the same. Thus, advantageously, if an SCA attacker has a different TC 402 than the victim that allocated the entry, the attacker access will likely experience a miss even though the attacker accesses the same physical memory address 404.

Figure 9:
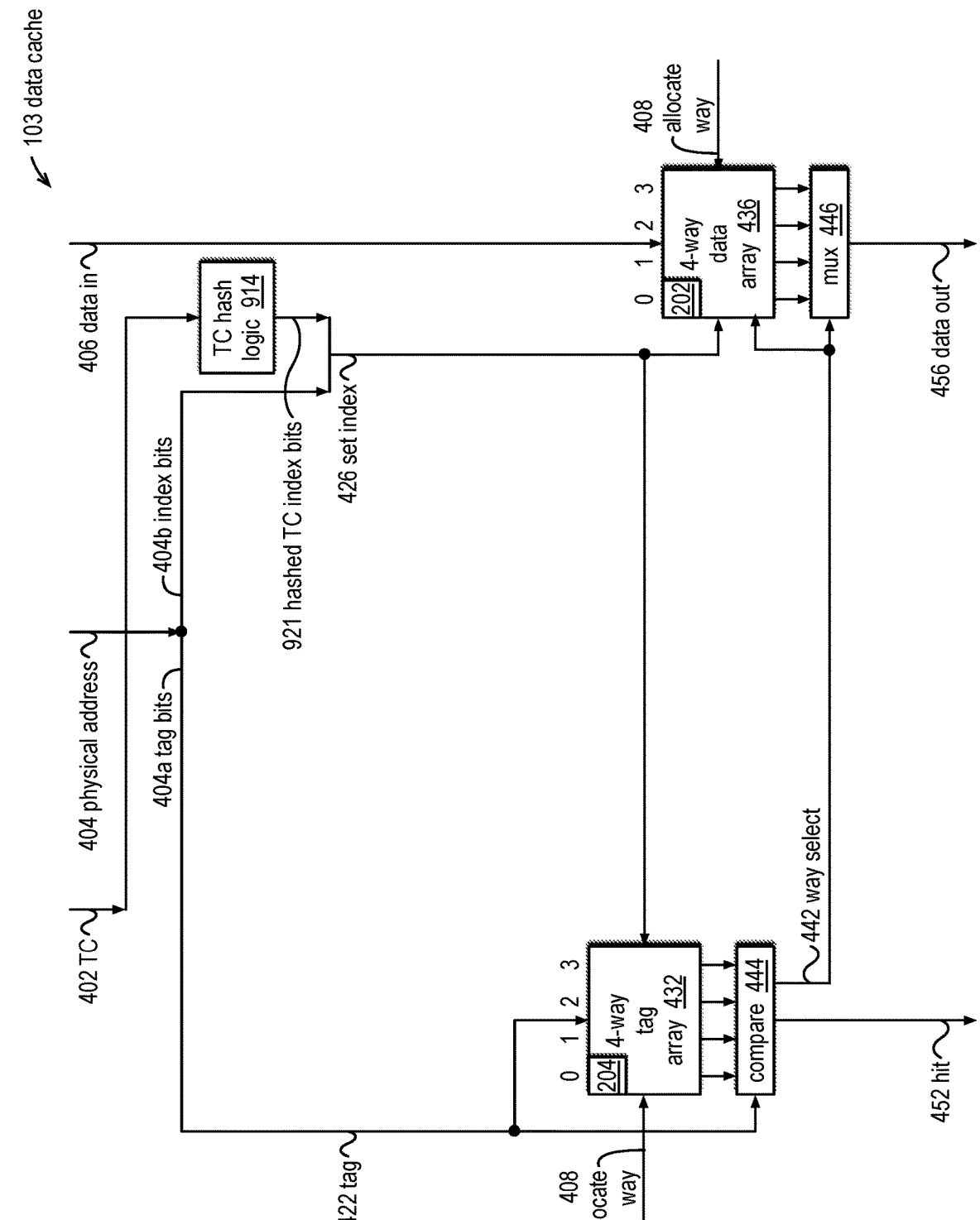
FIG. 9 is an example block diagram illustrating the data cache memory of FIG. 1 in accordance with embodiments of the present disclosure.

FIG. 9 is an example block diagram illustrating the data cache memory 103 of FIG. 1 in accordance with embodiments of the present disclosure. The data cache memory 103 of FIG. 9 is similar in many respects to the data cache memory 103 of FIG. 4 and like-numbered elements are similar. However, the entries of the data cache memory 103 of FIG. 9 are like the entries 201 of FIG. 2. That is, the physical address tag field 204 does not include TC information. Additionally, the tag 422 that is written to the physical address tag 204 of the tag array 432 during an allocation and that is compared with the physical address tags 204 of the selected set during an access is the tag bits 404a, i.e., the tag 422 does not include TC information. Finally, the data cache memory 103 of FIG. 9 includes TC hash logic 914 that hashes the TC 402 to generate hashed TC index bits 921. The hashed TC index bits 921 are combined with the index bits 404b of the physical memory address 404 to form the set index 426. In one embodiment, the set index 426 is formed as the concatenation of the hashed TC index bits 921 and the index bits 404b of the physical memory address 404, as shown in FIG. 9. In an alternate embodiment, the set index 426 may be formed as a hash of the hashed TC index bits 921 and the index bits 404b (which is mathematically equivalent to hashing the TC 402 and the index bits 404b). In other words, the TC hash logic 914 hashes the TC 402 and the index bits 404b to generate the set index 426. As a result of the formation of the set index 426 by including TC information in the set index 426, an access to a given physical address 404 with a different TC 402 value than the TC 402 value that allocated the given physical address 404 will likely select a different set of entries than selected by the allocation even though the access and allocation specify the same physical memory address 404, as described in more detail below.

As may observed, by including the TC 402 in the set index 426 (either by concatenating the hashed TC index bits 921 and the index bits 404b, or by hashing the TC index bits 921 and the index bits 404b), synonyms may be created within the data cache memory 103. That is, even though the data cache memory 103 is physically-tagged, a cache line having a given physical address could be allocated into multiple different sets of the data cache memory 103. In embodiments in which the set index 426 is formed as the concatenation of the hashed TC index bits 921 and the index bits 404b, the hashed TC index bits 921 may be different for different values of the TC 402, hence producing different values of the set index 426 even though the value of the index bits 404b is the same. In embodiments in which the set index 426 is formed as a hash of the hashed TC index bits 921 and the index bits 404b, the set index 426 (i.e., the result/output of the TC hash logic 914) may be different for different values of the TC 402, hence producing different values of the set index 426 even though the value of the index bits 404b is the same. To manage synonyms, in one embodiment, only one copy of a given physical cache line is allowed to allocate into the data cache memory 103. That is, when the physical cache line needs to be allocated into the data cache memory 103, if a copy of the physical cache line already resides in a different set of the data cache memory 103, then the already-present copy is invalidated (and first written back if it is dirty). In another embodiment, multiple copies of a physical cache line are allowed to allocate into the data cache memory 103, i.e., to be co-resident, but when a store is committed to any of the copies the other copies are invalidated (and first written back if it is dirty), and when a snoop is received for any of the copies all the copies are invalidated (and first written back if dirty). In another embodiment, multiple copies of a physical cache line are allowed to allocate into the data cache memory 103, when a store is committed to any of the copies all copies are written, and when a snoop is received all copies are invalidated (and first written back if it is dirty). Embodiments are also contemplated in which a portion of the index bits 404a are virtual address bits, i.e., the data cache memory 103 is a virtually-index, physically-tagged cache. In such embodiments, synonyms may be created as a result of inclusion of the virtual address bits in the set index. Furthermore, embodiments are contemplated in which a portion of the index bits 404a are virtual address bits and the TC is hashed into the set index. In such embodiments, synonyms may be created both by the hashing of the TC into the set index and by the virtual address bits.

Figure 10A:
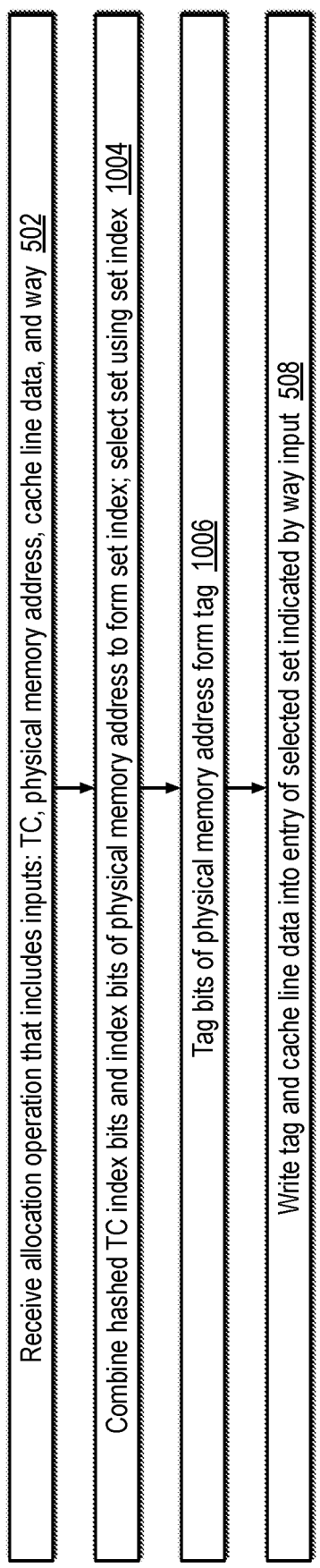
FIG. 10A is an example flowchart illustrating an operation to allocate an entry into the data cache memory of FIG. 9 in accordance with embodiments of the present disclosure.

FIG. 10A is an example flowchart illustrating an operation to allocate an entry into the data cache memory 103 of FIG. 9 in accordance with embodiments of the present disclosure. Operation begins at block 502 as in FIG. 5A and then proceeds to block 1004.

At block 1004, the TC 402 is hashed by TC hash logic 914 to generate the hashed TC index bits that are combined with the index bits 404b to form the set index 426. In one embodiment, the hash operation performed by the TC hash logic 914 is an exclusive-OR (XOR) of bits of the TC 402 in a predetermined arrangement to generate the number of bits that is the width of the hashed TC index bits 921. For example, there may be M hashed TC index bits 921 that may be concatenated with N index bits 404b to form a set index 426 of M+N bits to select $2^{(M+N)}$ sets as an illustrative example. For another example, the TC hash logic 914 may hash M bits of TC 402 with N index bits 404b to generate the set index 426. The set index 426 is then used to select a set of entries of the data array 436 and tag array 432. The hash function used by the TC hash logic 914 may be different from the hash function used by the TC hash logic 412 and/or the TC hash logic 712. Furthermore, it should be understood that less than all the bits of the TC 402 may be used in the various hash functions described herein. Operation proceeds to block 1006.

At block 1006, the tag 422 is formed by the tag bits 404a of the physical memory address 404. Operation proceeds to block 508 as in FIG. 5A.

Figure 10B:
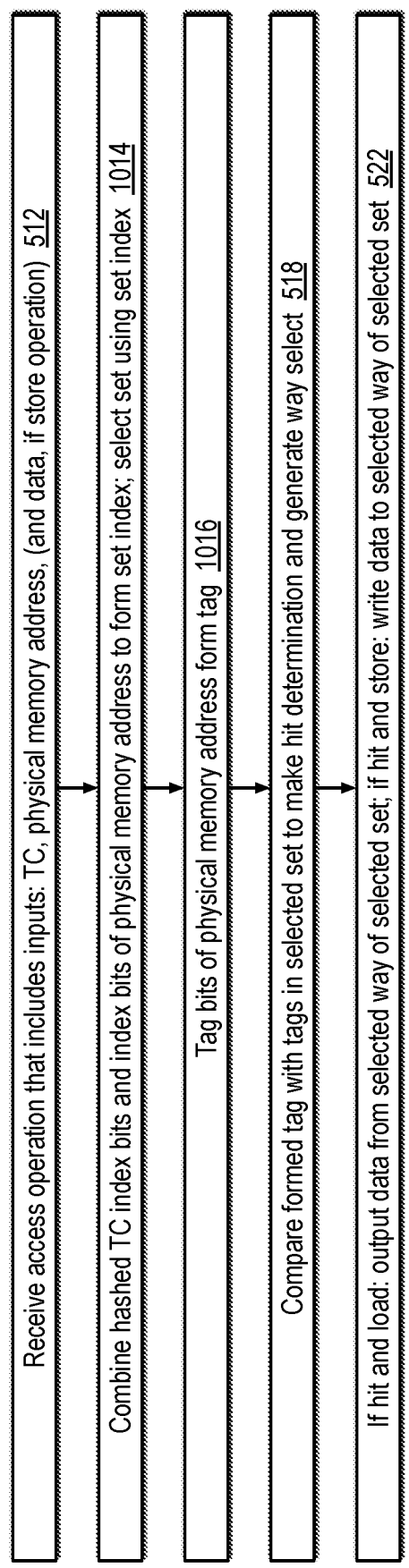
FIG. 10B is an example flowchart illustrating an operation to access the data cache memory of FIG. 9 in accordance with embodiments of the present disclosure.

FIG. 10B is an example flowchart illustrating an operation to access the data cache memory 103 of FIG. 9 in accordance with embodiments of the present disclosure. Operation begins at block 512 as in FIG. 5B and then proceeds to block 1014.

At block 1014, the TC 402 is hashed by TC hash logic 914 to generate the hashed TC index bits that are combined with the index bits 404b to form the set index 426. The set index 426 is then used to select a set of entries of the data array 436 and tag array 432. Operation proceeds to block 1016.

At block 1016, the tag 422 is formed by the tag bits 404a of the physical memory address 404. Operation proceeds to block 518 and then to block 522 as in FIG. 5B.

As may be observed from the description of FIGS. 9, 10A and 10B, because the value of a hash of the TC 402 is included in the set index 426, a subsequent access to the same value of the physical memory address 404 will hit on the allocated entry 301 only if the hash of the TC 402 value of the subsequent access is the same because only then will the same set be selected. Thus, advantageously, if an SCA attacker has a different TC 402 than the victim that allocated the entry, the attacker access will likely experience a miss even though the attacker accesses the same physical memory address 404.

Figure 11:
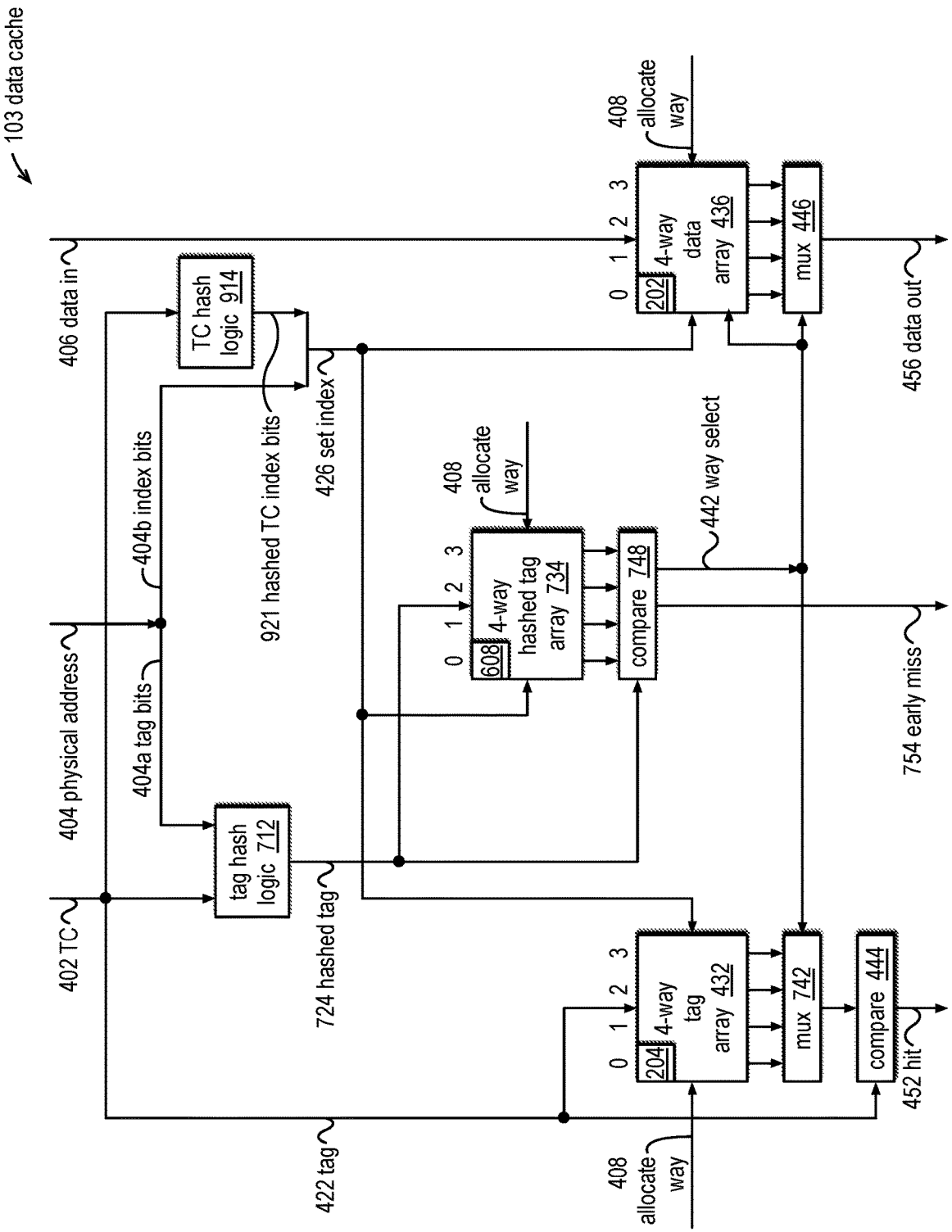
FIG. 11 is an example block diagram illustrating the data cache memory of FIG. 1 in accordance with embodiments of the present disclosure.

FIG. 11 is an example block diagram illustrating the data cache memory 103 of FIG. 1 in accordance with embodiments of the present disclosure. The data cache memory 103 of FIG. 11 is similar in many respects to the data cache memory 103 of FIG. 9 and like-numbered elements are similar. However, the data cache memory 103 of FIG. 11 includes the tag hash logic 712 of FIG. 7 that hashes the TC 402 and the tag bits 404a to generate the hashed tag 724. As a result of including TC information in the set index 426, an access to a given physical address 404 with a different TC 402 value than the TC 402 value that allocated the given physical address 404 will likely select a different set of entries than selected by the allocation even though the access and allocation specify the same physical memory address 404.

Figure 12A:
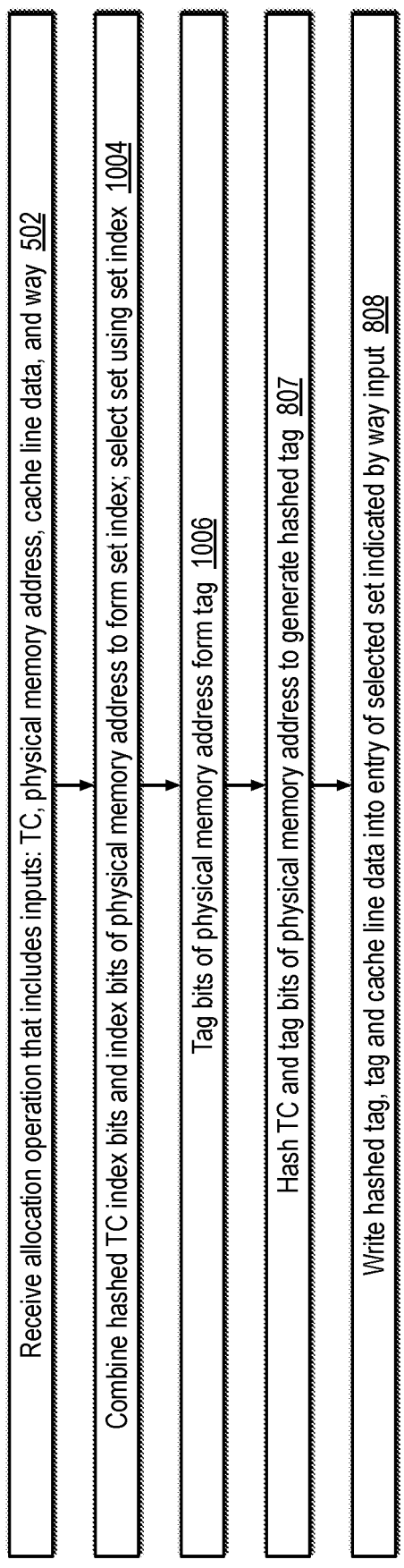
FIG. 12A is an example flowchart illustrating an operation to allocate an entry into the data cache memory of FIG. 11 in accordance with embodiments of the present disclosure.

FIG. 12A is an example flowchart illustrating an operation to allocate an entry into the data cache memory 103 of FIG. 11 in accordance with embodiments of the present disclosure. Operation begins at block 502 as in FIG. 5A and then proceeds to block 1004 and then proceeds to block 1006 as in FIG. 10A and then proceeds to block 807 and then proceeds to block 808 as in FIG. 8A.

Figure 12B:
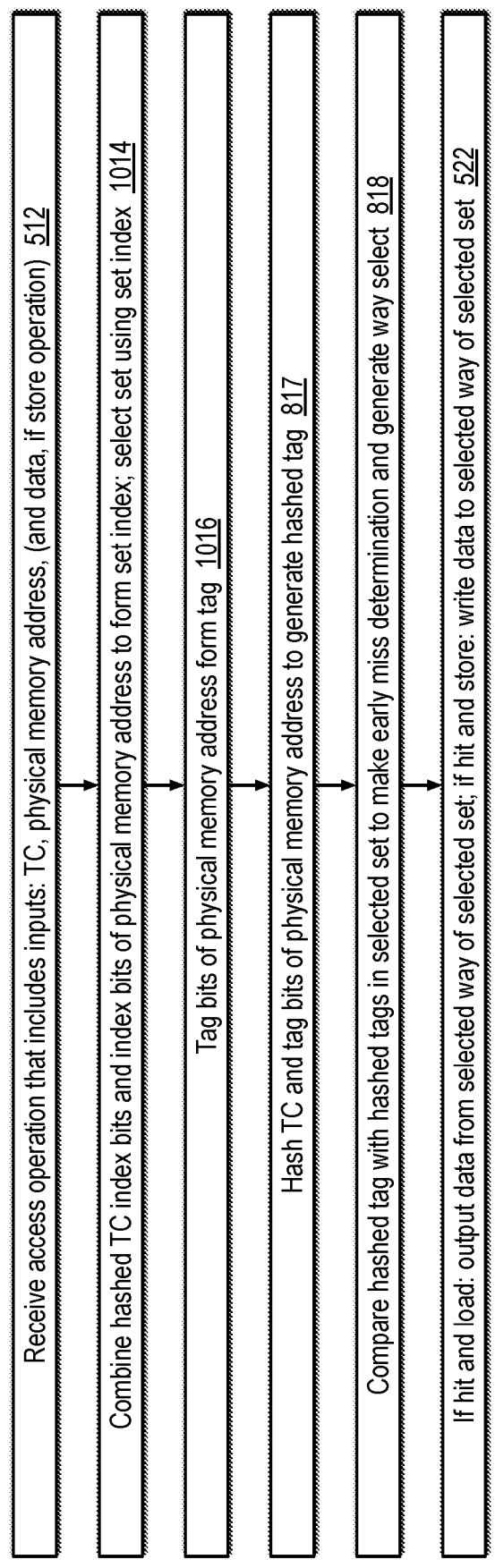
FIG. 12B is an example flowchart illustrating an operation to access the data cache memory of FIG. 11 in accordance with embodiments of the present disclosure.

FIG. 12B is an example flowchart illustrating an operation to access the data cache memory 103 of FIG. 11 in accordance with embodiments of the present disclosure. Operation begins at block 512 as in FIG. 5A then proceeds to block 1014 then proceeds to block 1016 as in FIG. 10B and then proceeds to block 817 and then proceeds to block 818 as in FIG. 8B and then proceeds to block 522 as in FIG. 5B.

As may be observed from the description of FIGS. 11, 12A and 12B, the embodiment enjoys similar advantages to those of FIGS. 9 and 7. More specifically, because the value of a hash of the TC 402 is included in the set index 426, a subsequent access to the same value of the physical memory address 404 will hit on the allocated entry 301 only if the hash of the TC 402 value of the subsequent access is the same because only then will the same set be selected. Thus, advantageously, if an SCA attacker has a different TC 402 than the victim that allocated the entry, the attacker access will likely experience a miss even though the attacker accesses the same physical memory address 404. Additionally, because the early miss 754 and way select 442 may be signaled earlier than the hit 452 and way select 442 of the embodiments of FIGS. 4 and 9, advantageously the time to data out 456 may be shortened, and the filling of a missing cache line may be initiated earlier.

Figure 13:
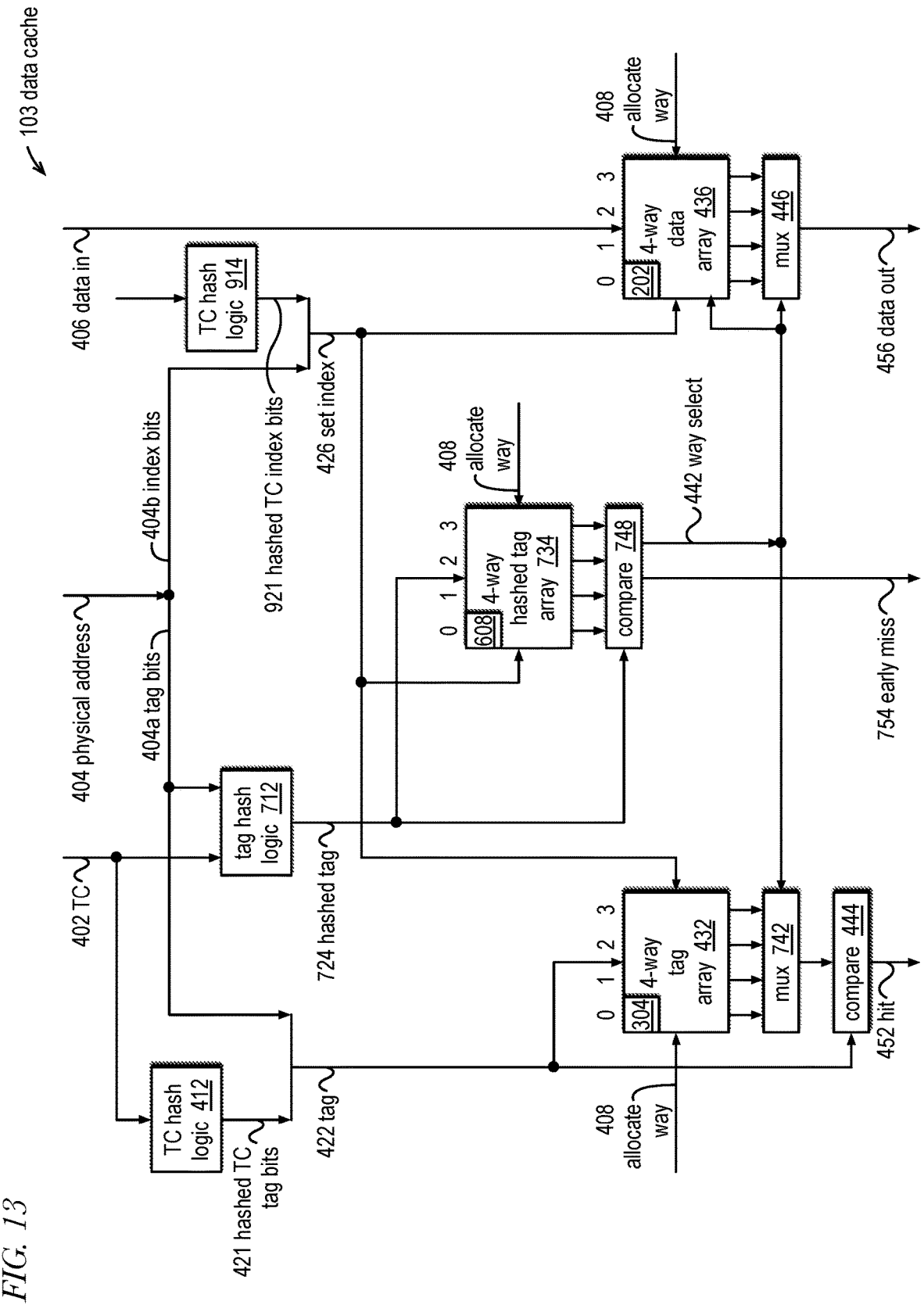
FIG. 13 is an example block diagram illustrating the data cache memory of FIG. 1 in accordance with embodiments of the present disclosure.

FIG. 13 is an example block diagram illustrating a cache memory 103 of FIG. 1 in accordance with embodiments of the present disclosure. The data cache memory 103 of FIG. 13 is similar in many respects to the data cache memory 103 of FIG. 11 and like-numbered elements are similar. However, in the data cache memory 103 of FIG. 13, each entry of the data cache memory 103 is structured as the entry 301 of FIG. 3; the tag 422 is formed as the concatenation of the hashed TC tag bits 421 and the tag bits 404a of the physical memory address 404; in the case of an allocation, the tag 422 is written into the tag 304 of the entry of the way selected by the allocate way input 408 of the selected set; and in the case of an access, the comparator 444 compares the tag 422 with the tag 304 selected by mux 742 of the selected set.

Figure 14A:
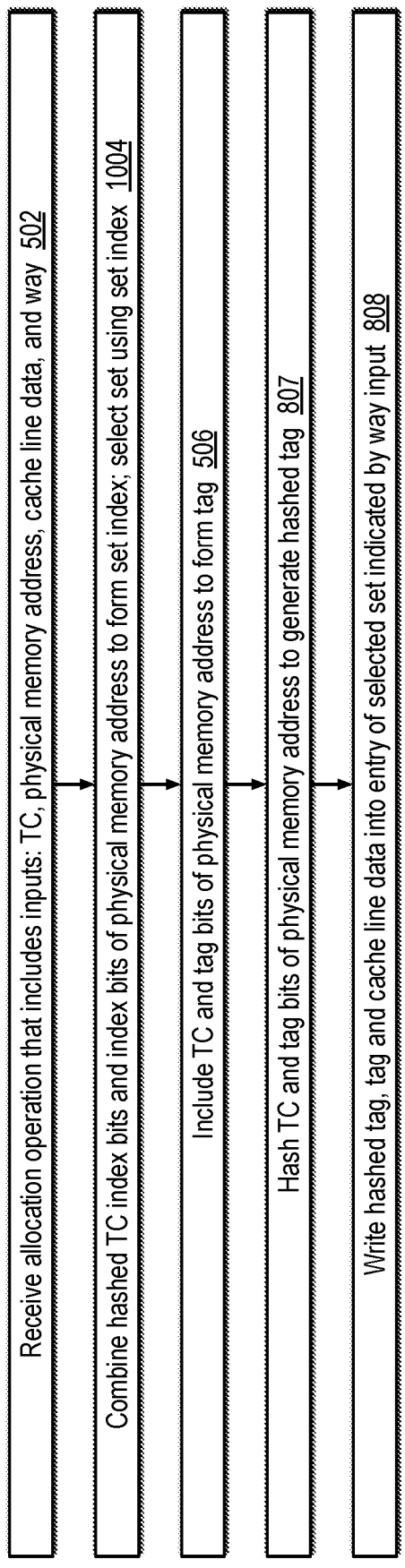
FIG. 14A is an example flowchart illustrating an operation to allocate an entry into the data cache memory of FIG. 13 in accordance with embodiments of the present disclosure.

FIG. 14A is an example flowchart illustrating an operation to allocate an entry into the data cache memory 103 of FIG. 13 in accordance with embodiments of the present disclosure. Operation begins at block 502 as in FIG. 5A and then proceeds to block 1004 as in FIG. 10A and then proceeds to block 506 as in FIG. 5A and then proceeds to block 807 and then proceeds to block 808 as in FIG. 8A.

Figure 14B:
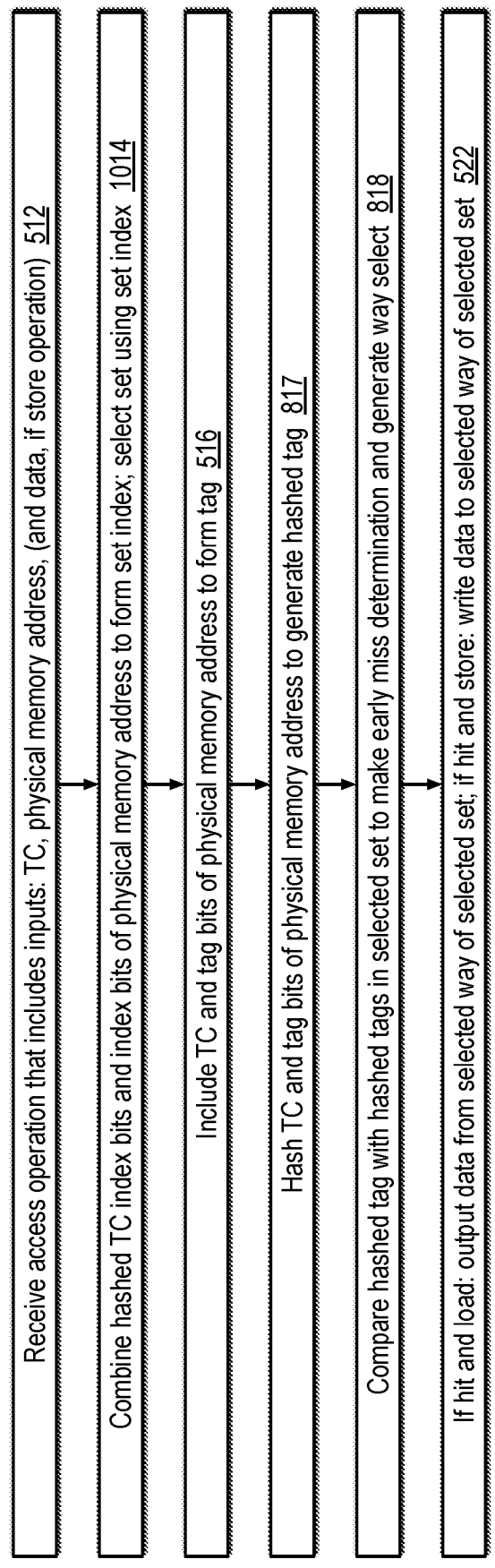
FIG. 14B is an example flowchart illustrating an operation to access the data cache memory of FIG. 13 in accordance with embodiments of the present disclosure.

FIG. 14B is an example flowchart illustrating an operation to access the data cache memory 103 of FIG. 13 in accordance with embodiments of the present disclosure. Operation begins at block 512 as in FIG. 5A then proceeds to block 1014 as in FIG. 10B and then proceeds to block 516 as in FIG. 5B and then proceeds to block 817 and then proceeds to block 818 as in FIG. 8B and then proceeds to block 522 as in FIG. 5B.

As may be observed from the description of FIGS. 13, 14A and 14B, the embodiment enjoys similar advantages to those of FIGS. 4, 9 and 7. More specifically, because a hash of the TC 402 of the allocation is included in the tag 422 that is written to the tag 304 of the allocated entry 301, a subsequent access to the same value of the physical memory address 404 will hit on the allocated entry 301 only if the hash of the TC 402 value of the subsequent access is the same. Thus, advantageously, if an SCA attacker has a different TC 402 than the victim that allocated the entry, the attacker access will likely experience a miss even though the attacker accesses the same physical memory address 404. Additionally, because the value of a hash of the TC 402 is included in the set index 426, a subsequent access to the same value of the physical memory address 404 will hit on the allocated entry 301 only if the hash of the TC 402 value of the subsequent access is the same because only then will the same set be selected. Thus, advantageously, if an SCA attacker has a different TC 402 than the victim that allocated the entry, the attacker access will likely experience a miss even though the attacker accesses the same physical memory address 404. Finally, because the early miss 754 and way select 442 may be signaled earlier than the hit 452 and way select 442 of the embodiments of FIGS. 4 and 9, advantageously the time to data out 456 may be shortened, and the filling of a missing cache line may be initiated earlier.

Figure 15:
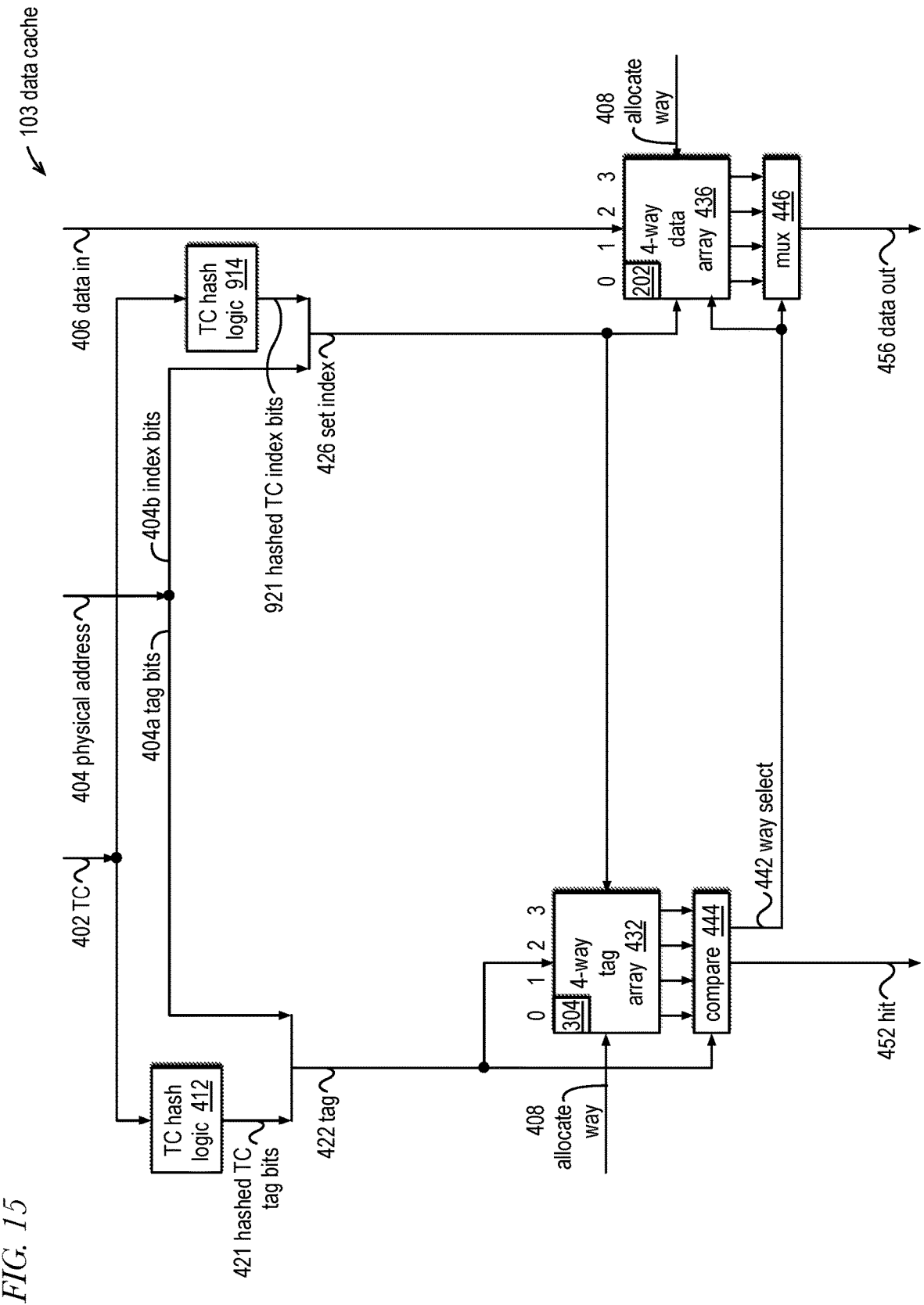
FIG. 15 is an example block diagram illustrating the data cache memory of FIG. 1 in accordance with embodiments of the present disclosure.

FIG. 15 is an example block diagram illustrating the data cache memory 103 of FIG. 1 in accordance with embodiments of the present disclosure. The data cache memory 103 of FIG. 15 is similar in many respects to the data cache memory 103 of FIG. 4 and like-numbered elements are similar. However, similar to the data cache memory 103 of FIG. 9, the data cache memory 103 of FIG. 15 includes TC hash logic 914 that hashes the TC 402 to generate hashed TC index bits 921. The set index 426 is formed as a combination of the hashed TC index bits 921 and the index bits 404b of the physical memory address 404. As a result of this formation of the set index 426, i.e., by including TC information in the set index 426, an access to a given physical address 404 with a different TC 402 value than the TC 402 value that allocated the given physical address 404 will likely select a different set of entries than selected by the allocation even though the access and allocation specify the same physical memory address 404.

Figure 16A:
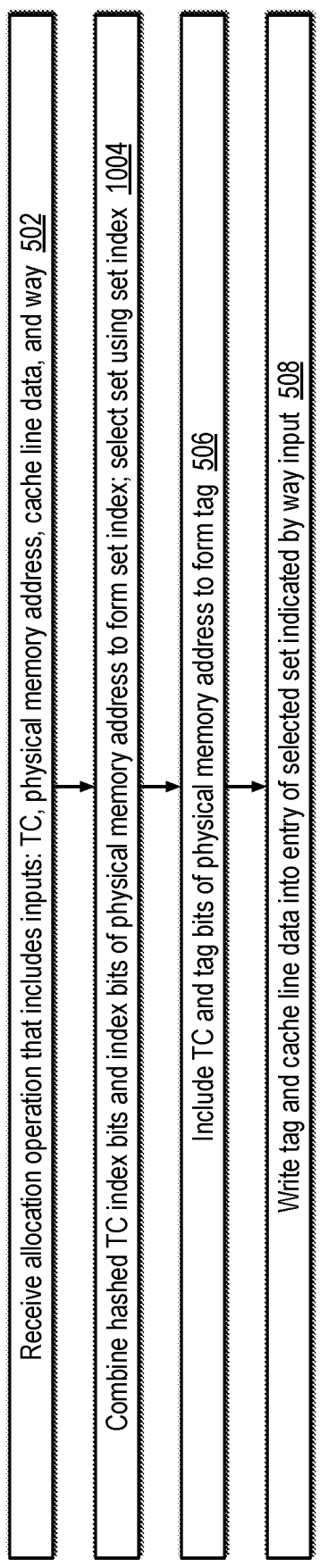
FIG. 16A is an example flowchart illustrating an operation to allocate an entry into the data cache memory of FIG. 15 in accordance with embodiments of the present disclosure.

FIG. 16A is an example flowchart illustrating an operation to allocate an entry into the data cache memory 103 of FIG. 15 in accordance with embodiments of the present disclosure. Operation begins at block 502 as in FIG. 5A and then proceeds to block 1004 as in FIG. 10A and then proceeds to block 506 and then proceeds to block 508 as in FIG. 5A.

Figure 16B:
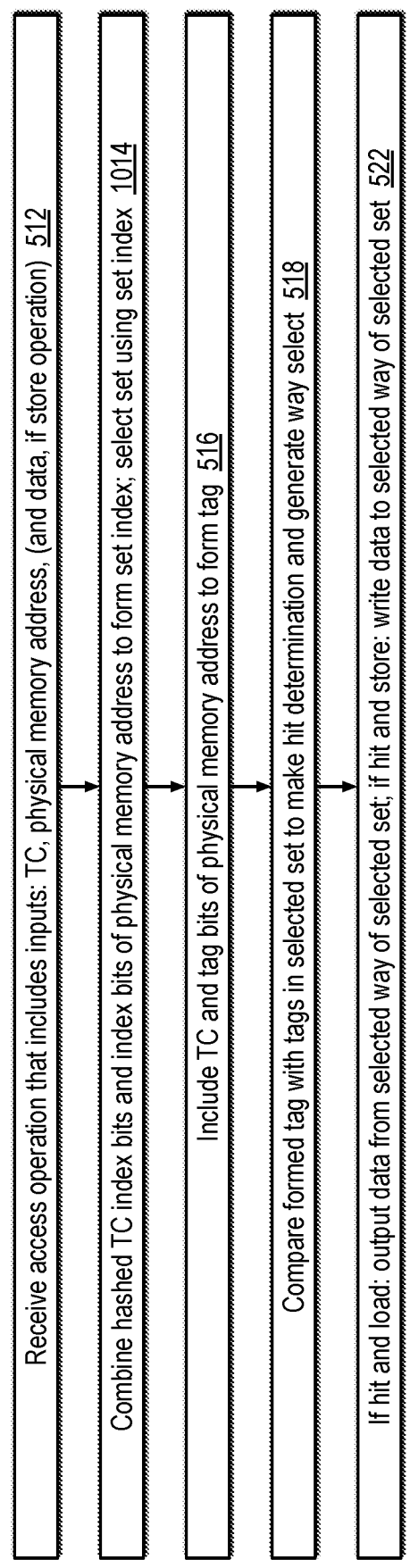
FIG. 16B is an example flowchart illustrating an operation to access the data cache memory of FIG. 15 in accordance with embodiments of the present disclosure.

FIG. 16B is an example flowchart illustrating an operation to access the data cache memory 103 of FIG. 15 in accordance with embodiments of the present disclosure. Operation begins at block 512 as in FIG. 5A then proceeds to block 1014 as in FIG. 10B and then proceeds to block 516 and then proceeds to block 518 and then proceeds to block 522 as in FIG. 5B.

As may be observed from the description of FIGS. 15, 16A and 16B, the embodiment enjoys similar advantages to those of FIGS. 4 and 9. More specifically, because a hash of the TC 402 of the allocation is included in the tag 422 that is written to the tag 304 of the allocated entry 301, a subsequent access to the same value of the physical memory address 404 will hit on the allocated entry 301 only if the hash of the TC 402 value of the subsequent access is the same. Thus, advantageously, if an SCA attacker has a different TC 402 than the victim that allocated the entry, the attacker access will likely experience a miss even though the attacker accesses the same physical memory address 404. Additionally, because the value of a hash of the TC 402 is included in the set index 426, a subsequent access to the same value of the physical memory address 404 will hit on the allocated entry 301 only if the hash of the TC 402 value of the subsequent access is the same because only then will the same set be selected. Thus, advantageously, if an SCA attacker has a different TC 402 than the victim that allocated the entry, the attacker access will likely experience a miss even though the attacker accesses the same physical memory address 404. The advantage may be obtained at the expense of a potentially reduced performance in certain situations. For example, two different translation contexts that legitimately share a memory location may experience more cache misses. More specifically, if the two translation contexts are only reading the shared location, then performance may not suffer since there will be synonyms in the cache in embodiments that allow co-resident synonyms, as described above with respect to FIG. 9. However, if the two contexts are reading and writing the location (e.g., atomic read-modify-writes of a semaphore), then performance may suffer since the other synonym may need to be flushed and/or the data cache design may be more complex to handle writing to all synonyms.

Various elements of the cache memory embodiments, such as comparators 444, multiplexers 446, tag hash logic 712, multiplexers 742, comparators 748, TC hash logic 412 and TC hash logic 914, may be referred to collectively and generally as control logic. In one embodiment, the control logic may function essentially as an element of a load/store unit (e.g., LSU 117 of FIG. 1), that is in communication with the data cache memory, that executes load/store and other memory operations. In one embodiment, the load/store unit includes multiple parallel execution pipelines that can receive multiple corresponding memory operations each cycle. Furthermore, although embodiments are described in which the cache memory is employed in a first level of the cache hierarchy of the processor, other embodiments are contemplated in which the cache memory is employed at higher levels of the cache hierarchy. Finally, in one embodiment the data cache memory 103 is a write-through cache.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wireline or another communications medium, having instructions stored thereon that are capable of causing or configuring the apparatus and methods described herein.

The invention claimed is:

1. A data cache in a microprocessor, comprising:
   a first input that receives a physical memory address, wherein the physical memory address comprises tag bits and index bits;
   a tag formed using the tag bits;
   an index formed using the index bits; and
   a second input that receives a translation context (TC), wherein the TC comprises:
   an address space identifier (ASID) of the microprocessor; or
   a virtual machine identifier (VMID) of the microprocessor; or
   a privilege mode (PM) or a translation regime (TR) of the microprocessor; or a combination of two or more of the ASID, the VMID, and the PM or the TR;
wherein the tag and/or the index are further formed using a hash of the TC;
wherein the further formed tag and/or the further formed index are used:
  to perform each allocation of an entry in the data cache; and
  in a determination of whether each access hits in the data cache;
wherein the TC comprises the TR; and
wherein the TR indicates whether address translation is on or off and/or whether one level or two levels of address translation is needed to translate a virtual memory address into the physical memory address.

2. The data cache of claim 1,
wherein the further formed index is formed as a concatenation of the index bits and the hash of the TC.

3. The data cache of claim 1,
wherein the further formed index is formed as a hash of the index bits and the hash of the TC.

4. The data cache of claim 1,
wherein the further formed tag is formed as a concatenation of the tag bits and the hash of the TC.

5. The data cache of claim 1,
wherein each entry of the data cache comprises:
  cache line data; and
  a tag; and
wherein, during an access of the data cache, the further formed tag is compared with the tag of each of one or more entries selected by the index to determine whether the physical memory address hits in the data cache.

6. The data cache of claim 1,
wherein each entry of the data cache comprises:
  cache line data; and
  a tag; and
wherein, during an allocation of an entry in the data cache, the further formed tag is written to the tag of the allocated entry.

7. The data cache of claim 1,
wherein the TR further indicates a form of translation table scheme involved in the address translation.

8. The data cache of claim 1,
wherein when the TR indicates one level of address translation is needed, the address translation is performed based on the ASID; and
wherein when the TR indicates two levels of address translation is needed, the address translation is performed based on the ASID and the VMID.

9. The data cache of claim 1,
wherein a first TR is shared by a user privilege mode and a supervisor privilege mode in which one level of address translation is required based on the ASID; and
wherein a second TR is shared by a virtual user privilege mode and a virtual supervisor privilege mode in which two levels of address translation are required based on the ASID and the VMID; and
wherein a third TR requires no address translation.

10. The data cache of claim 1,
wherein the ASID, the VMID, and the PM or TR comprises architectural state of the microprocessor stored in control registers of the microprocessor; and
wherein entries of a translation lookaside buffer (TLB) of the microprocessor are tagged with at least a portion of the ASID, the VMID, and/or the PM or TR, wherein the TLB caches translations of virtual memory addresses to physical memory addresses.

11. A method for use in a microprocessor having a data cache, comprising:
  receiving, on a first input, a physical memory address, wherein the physical memory address comprises tag bits and index bits;
  forming a tag using the tag bits;
  forming an index using the index bits;
  receiving, on a second input, a translation context (TC), wherein the TC comprises:
    an address space identifier (ASID) of the microprocessor; or
    a virtual machine identifier (VMID) of the microprocessor; or
    a privilege mode (PM) or a translation regime (TR) of the microprocessor; or
    a combination of two or more of the ASID, the VMID, and the PM or the TR;
  further forming the tag and/or the index using a hash of the TC;
  using the further formed tag and/or the further formed index:
    to perform each allocation of an entry in the data cache; and
    in a determination of whether each access hits in the data cache;
  wherein the TC comprises the TR; and
  wherein the TR indicates whether address translation is on or off and/or whether one level or two levels of address translation is needed to translate a virtual memory address into the physical memory address.

12. The method of claim 11,
wherein the further formed index is formed as a concatenation of the index bits and the hash of the TC.

13. The method of claim 11,
wherein the further formed index is formed as a hash of the index bits and the hash of the TC.

14. The method of claim 11,
wherein the further formed tag is formed as a concatenation of the tag bits and the hash of the TC.

15. The method of claim 11,
wherein each entry of the data cache comprises:
  cache line data; and
  a tag; and
comparing, during an access of the data cache, the further formed tag with the tag of each of one or more entries selected by the index to determine whether the physical memory address hits in the data cache.

16. The method of claim 11,
wherein each entry of the data cache comprises:
  cache line data; and
  a tag; and
writing, during an allocation of an entry in the data cache, the further formed tag to the tag of the allocated entry.

17. The method of claim 11,
wherein the TR further indicates a form of translation table scheme involved in the address translation.

18. The method of claim 11,
wherein when the TR indicates one level of address translation is needed, the address translation is performed based on the ASID; and
wherein when the TR indicates two levels of address translation is needed, the address translation is performed based on the ASID and the VMID.

19. The method of claim 11,
wherein a first TR is shared by a user privilege mode and a supervisor privilege mode in which one level of address translation is required based on the ASID; and wherein a second TR is shared by a virtual user privilege mode and a virtual supervisor privilege mode in which two levels of address translation are required based on the ASID and the VMID; and wherein a third TR requires no address translation.

20. The method of claim 11, wherein the ASID, the VMID, and the PM or TR comprises architectural state of the microprocessor stored in control registers of the microprocessor; and wherein entries of a translation lookaside buffer (TLB) of the microprocessor are tagged with at least a portion of the ASID, the VMID, and/or the PM or TR, wherein the TLB caches translations of virtual memory addresses to physical memory addresses.

21. A non-transitory computer-readable medium having instructions stored thereon that are capable of causing or configuring a microprocessor that has a data cache to perform operations comprising:

receiving, on a first input, a physical memory address, wherein the physical memory address comprises tag bits and index bits;

forming a tag using the tag bits;

forming an index using the index bits;

receiving, on a second input, a translation context (TC), wherein the TC comprises:
- an address space identifier (ASID) of the microprocessor; or
- a virtual machine identifier (VMID) of the microprocessor; or
- a privilege mode (PM) or a translation regime (TR) of the microprocessor;
- a combination of two or more of the ASID, the VMID, and the PM or the TR;

further forming the tag and/or the index using a hash of the TC;

using the further formed tag and/or the further formed index:
- to perform each allocation of an entry in the data cache; and
- in a determination of whether each access hits in the data cache;

wherein the TC comprises the TR; and wherein the TR indicates whether address translation is on or off and/or whether one level or two levels of address translation is needed to translate a virtual memory address into the physical memory address.

22. A data cache in a microprocessor, comprising:

a first input that receives a physical memory address, wherein the physical memory address comprises tag bits and index bits;

a tag formed using the tag bits;

an index formed using the index bits; and a second input that receives a translation context (TC), wherein the TC comprises:
- an address space identifier (ASID) of the microprocessor; or
- a virtual machine identifier (VMID) of the microprocessor; or
- a privilege mode (PM) or a translation regime (TR) of the microprocessor; or
- a combination of two or more of the ASID, the VMID, and the PM or the TR;

wherein either the tag or the index or both are further formed using a hash of the TC;

wherein the further formed tag and/or the further formed index are used:
- to perform each allocation of an entry in the data cache; and
- in a determination of whether each access hits in the data cache;

wherein the ASID, the VMID, and the PM or TR comprises architectural state of the microprocessor stored in control registers of the microprocessor; and wherein entries of a translation lookaside buffer (TLB) of the microprocessor are tagged with at least a portion of the ASID, the VMID, and/or the PM or TR, wherein the TLB caches translations of virtual memory addresses to physical memory addresses.

23. A method for use in a microprocessor having a data cache, comprising:

receiving, on a first input, a physical memory address, wherein the physical memory address comprises tag bits and index bits;

forming a tag using the tag bits;

forming an index using the index bits;

receiving, on a second input, a translation context (TC), wherein the TC comprises:
- an address space identifier (ASID) of the microprocessor; or
- a virtual machine identifier (VMID) of the microprocessor; or
- a privilege mode (PM) or a translation regime (TR) of the microprocessor; or
- a combination of two or more of the ASID, the VMID, and the PM or the TR;

further forming either the tag or the index or both using a hash of the TC;

using the further formed tag and/or the further formed index:
- to perform each allocation of an entry in the data cache; and
- in a determination of whether each access hits in the data cache;

wherein the ASID, the VMID, and the PM or TR comprises architectural state of the microprocessor stored in control registers of the microprocessor;

caching translations of virtual memory addresses to physical memory addresses in a translation lookaside buffer (TLB) of the microprocessor; and tagging entries of the TLB with at least a portion of the ASID, the VMID, and/or the PM or TR.

* * * * *

UNITED STATES PATENT AND TRADEMARK OFFICE
CERTIFICATE OF CORRECTION

| | | |
|---|---|---|
| PATENT NO. | : 12,118,076 B2 | |
| APPLICATION NO. | : 18/130093 | |
| DATED | : October 15, 2024 | |
| INVENTOR(S) | : John G. Favor and Srivatsan Srinivasan | |

It is certified that error appears in the above-identified patent and that said Letters Patent is hereby corrected as shown below:

In the Claims

In Column 27, Line 31, in Claim 21, delete "microprocessor;" and insert -- microprocessor; or --, therefor.

Signed and Sealed this
Tenth Day of December, 2024

Katherine Kelly Vidal
*Director of the United States Patent and Trademark Office*